United States Patent
Wechsler

[15] 3,635,622
[45] Jan. 18, 1972

[54] AUTOMATIC RECORD PRESS
[72] Inventor: Paul H. Wechsler, Glendale, Calif.
[73] Assignee: Capitol Records, Inc., Hollywood, Calif.
[22] Filed: Jan. 8, 1969
[21] Appl. No.: 789,829

[52] U.S. Cl. ........................... 425/116, 408/151, 408/162, 408/291, 408/301, 408/302, 408/395, 408/397, 408/408
[51] Int. Cl. ....................................... B29d 17/00
[58] Field of Search ........................... 18/5.3 F, 5.3 M, 5.3 P

[56] References Cited

UNITED STATES PATENTS

| | | | |
|---|---|---|---|
| 2,743,478 | 5/1956 | Harlow et al. | 18/5.3 P |
| 2,839,306 | 6/1958 | Bayless | 18/5.3 F X |
| 3,113,905 | 12/1963 | Rosen | 18/5.3 M X |
| 3,186,029 | 6/1965 | Joseph | 18/5.3 P |
| 3,298,059 | 1/1967 | Sakamoto | 18/5.3 F |
| 3,329,997 | 7/1967 | Rand et al. | 18/5.3 P |
| 3,412,427 | 11/1968 | Flusfeder et al. | 18/5.3 P |
| 3,514,813 | 6/1970 | Westermann | 18/5.3 P |
| 3,528,127 | 9/1970 | Damm et al. | 18/5.3 P |

*Primary Examiner*—J. Howard Flint, Jr.
*Attorney*—Spensley, Horn and Lubitz

[57] ABSTRACT

There is disclosed a machine for manufacturing articles requiring a plurality of successive operations. The machine includes a plurality of work stations equidistantly spaced from each other in the line of progression of the successive operation and each work station is equipped with operation performing instrumentalities suitable for those particular stations. A reciprocable workpiece transport means periodically and simultaneously transports all workpieces in their various stages of completion to the next work station so that at each cycle of operation the machine is performing the required operations on a plurality of articles. The illustrated embodiment is a machine for the automatic production of phonograph records.

5 Claims, 42 Drawing Figures

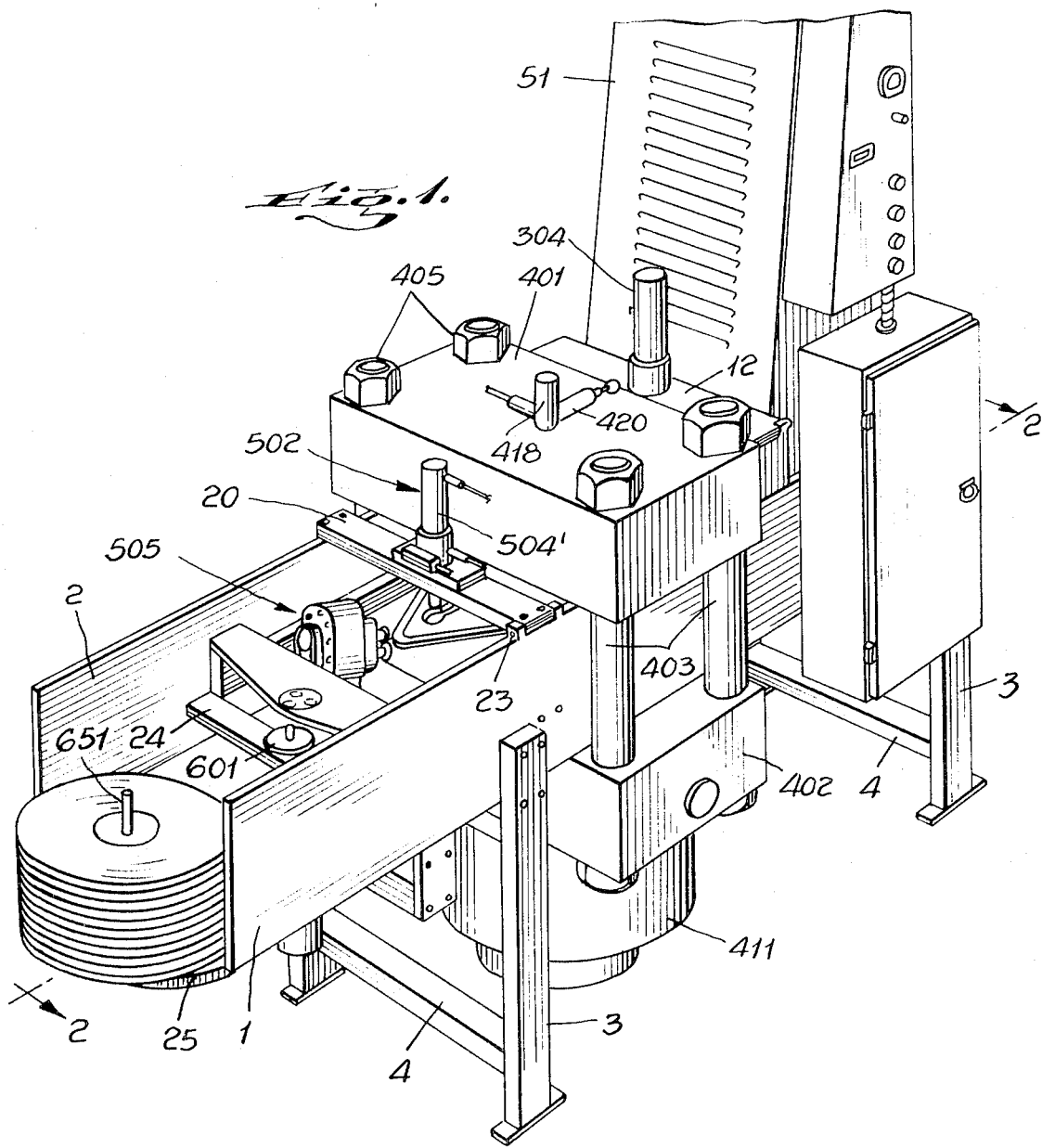
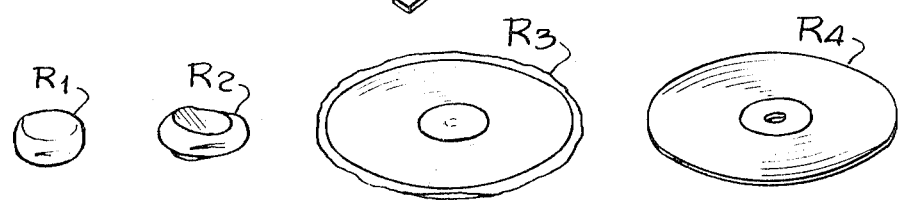

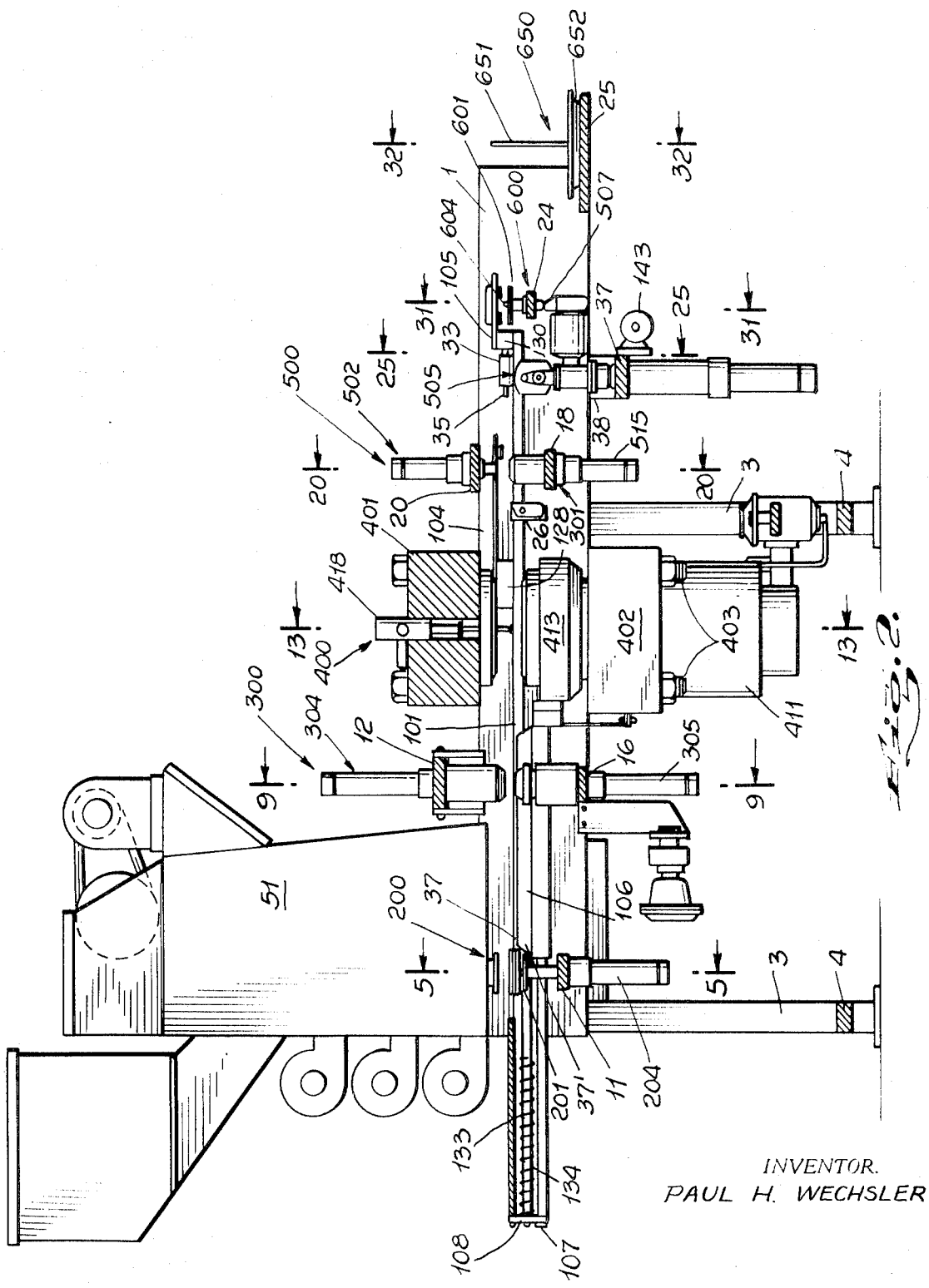

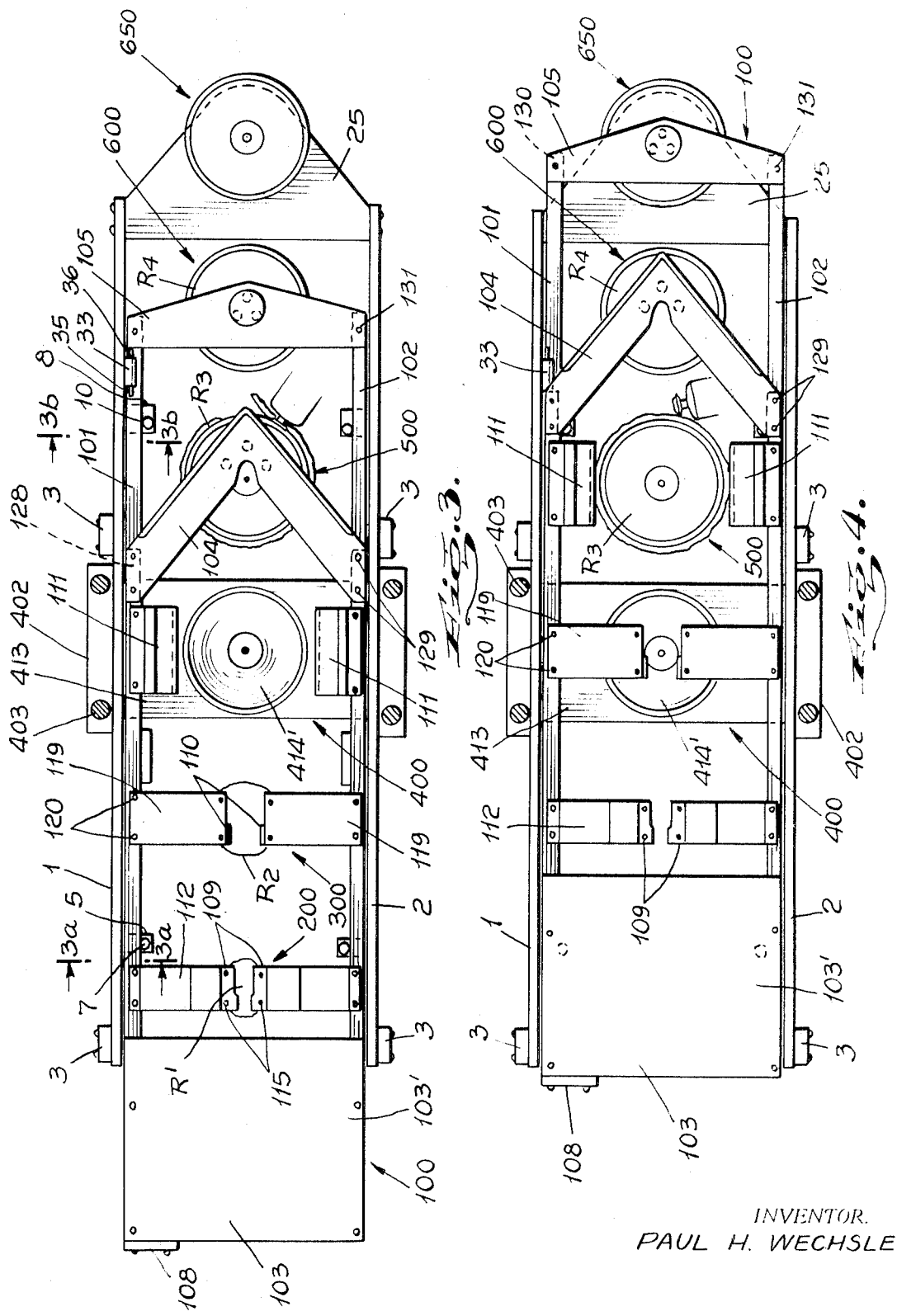

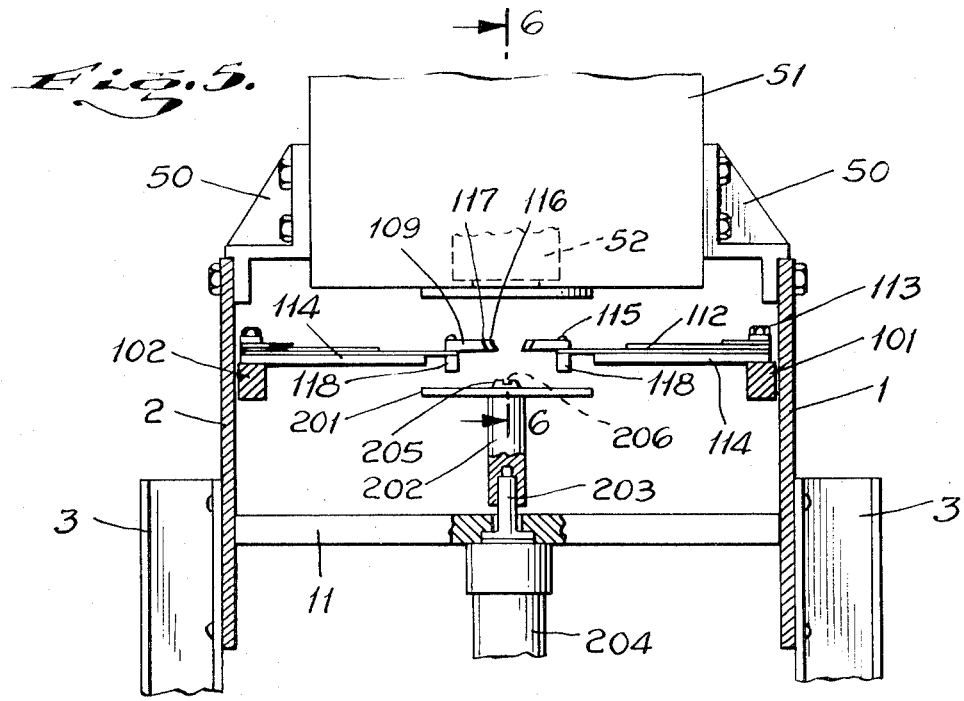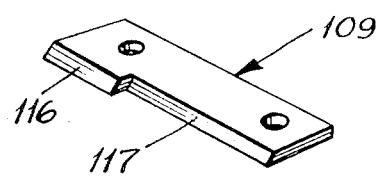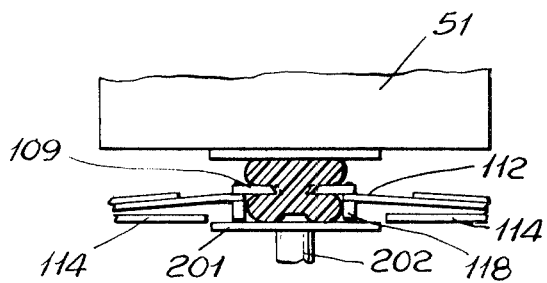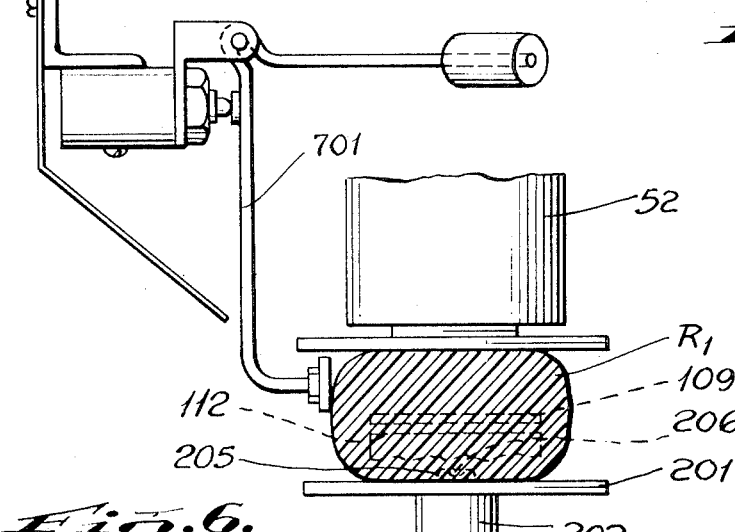

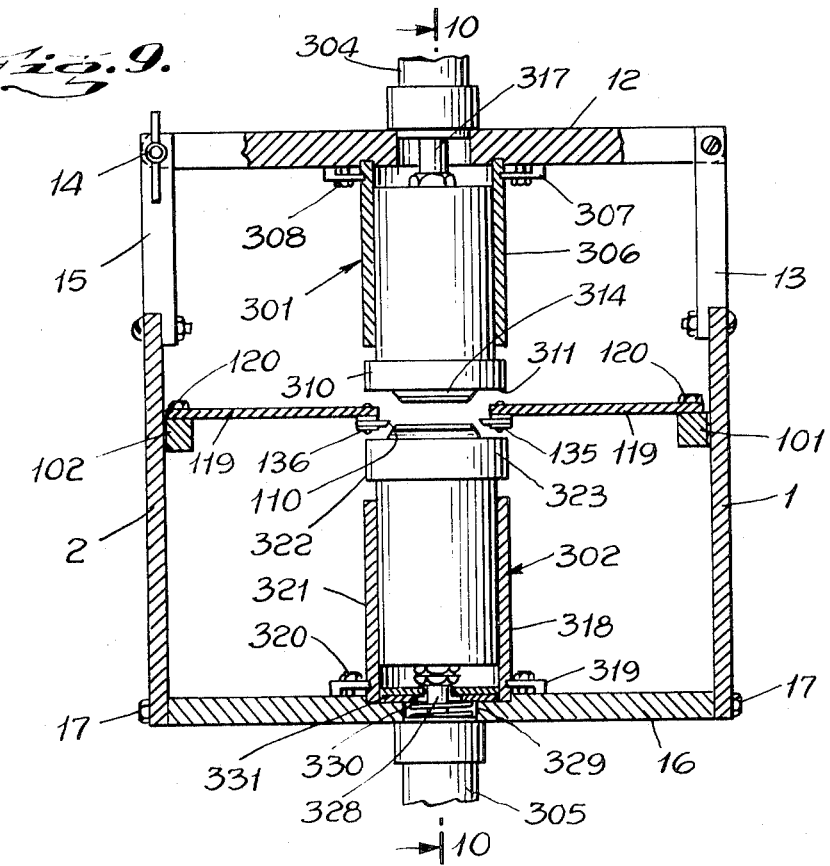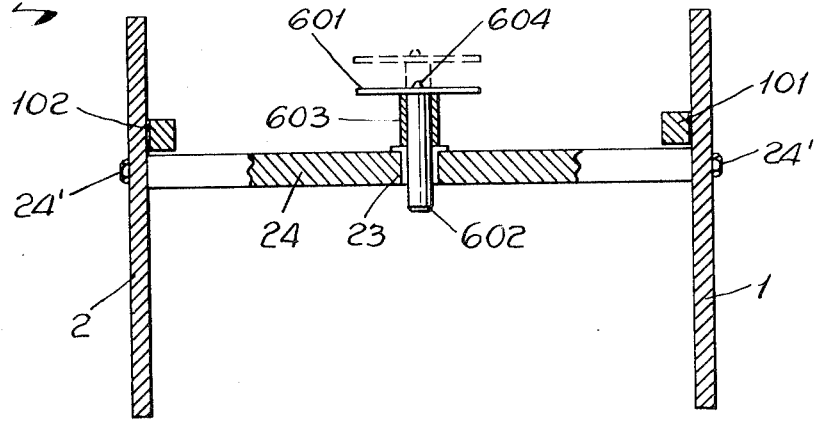

INVENTOR.
PAUL H. WECHSLER

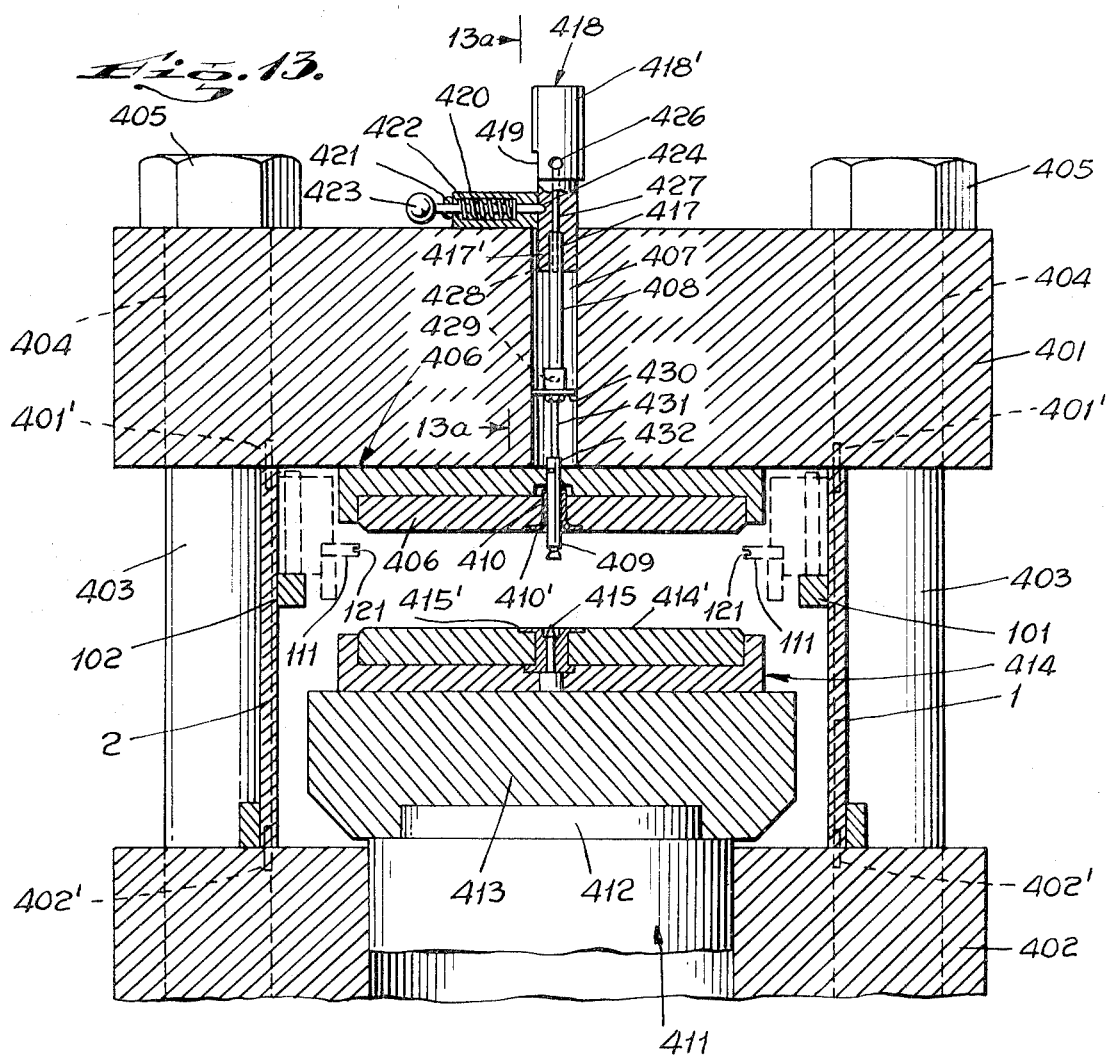
Fig. 13.
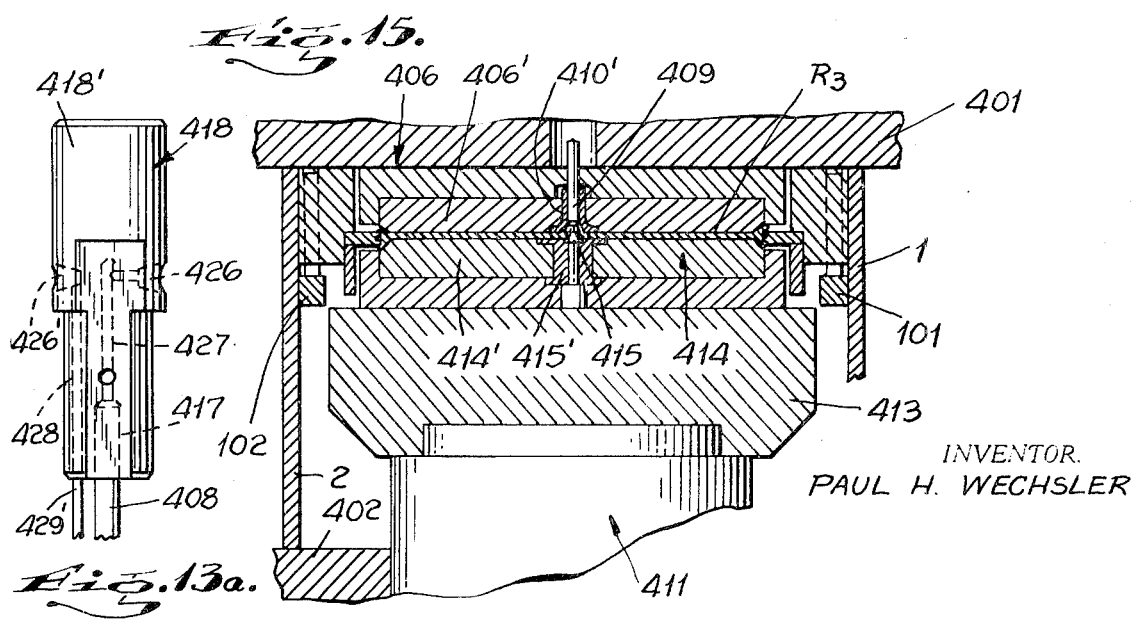
Fig. 13a.
Fig. 15.
INVENTOR.
PAUL H. WECHSLER

INVENTOR
PAUL H. WECHSLER

INVENTOR.
PAUL H. WECHSLER

INVENTOR.
PAUL H. WECHSLER

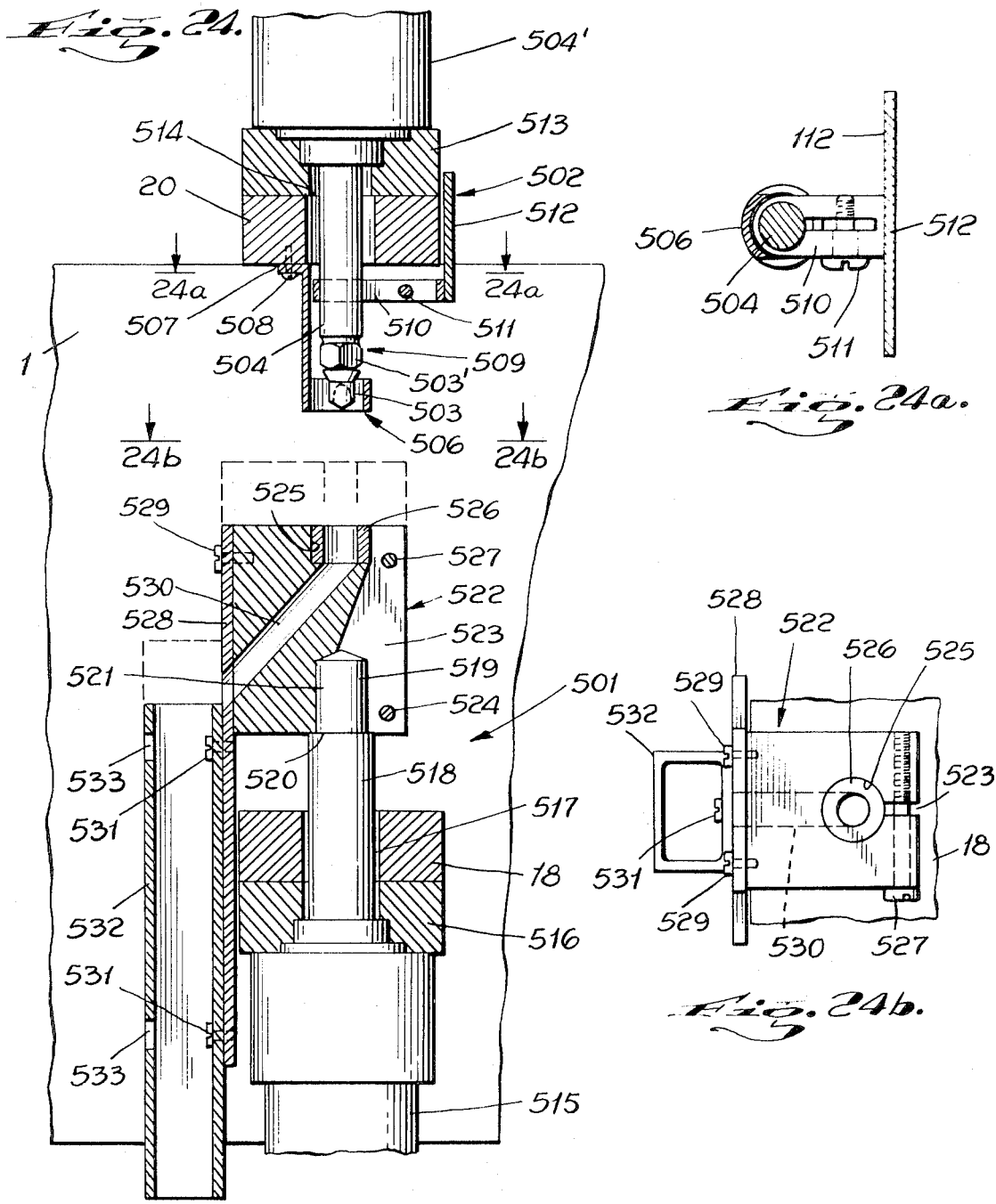

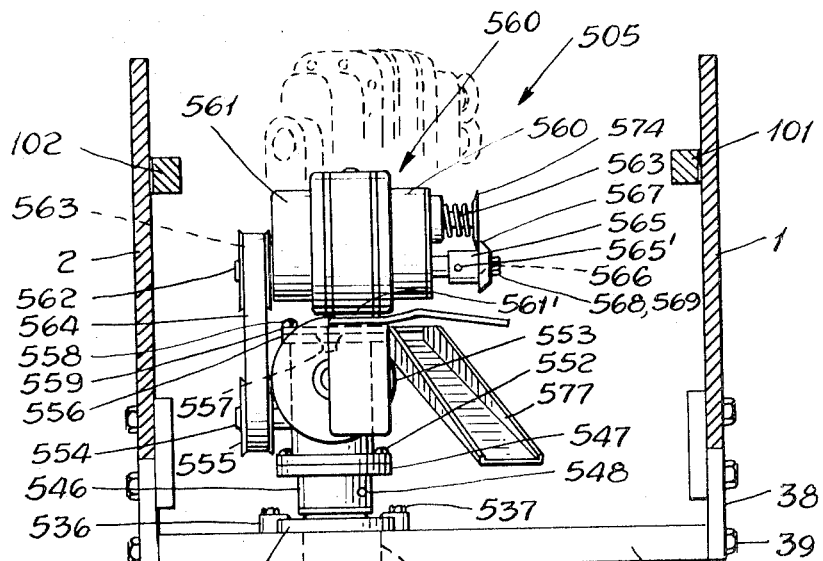
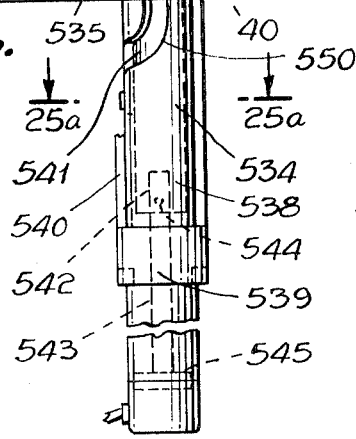
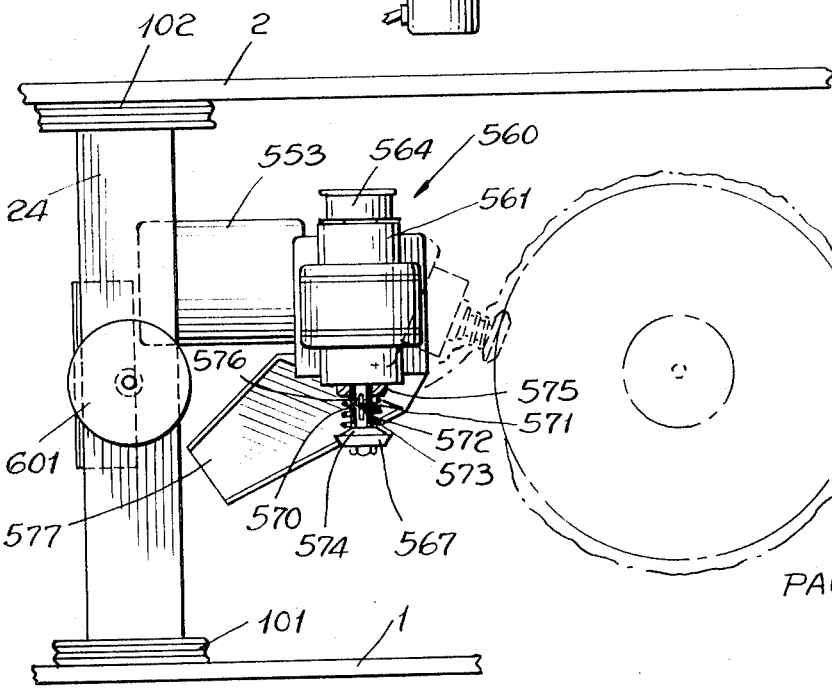
Fig. 25.
Fig. 25a.
Fig. 26.
INVENTOR.
PAUL H. WECHSLER

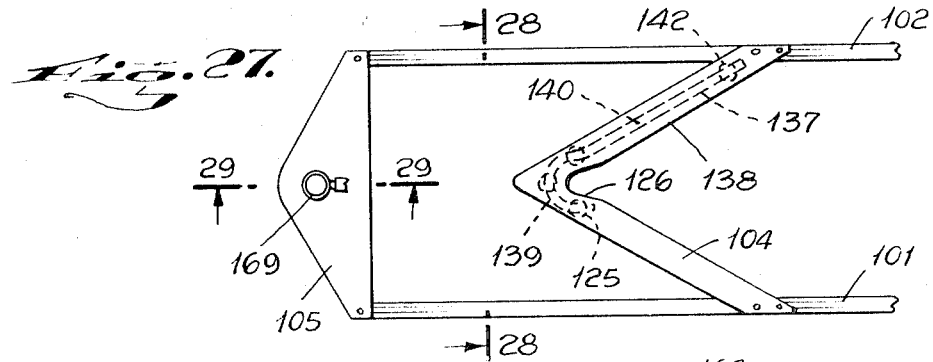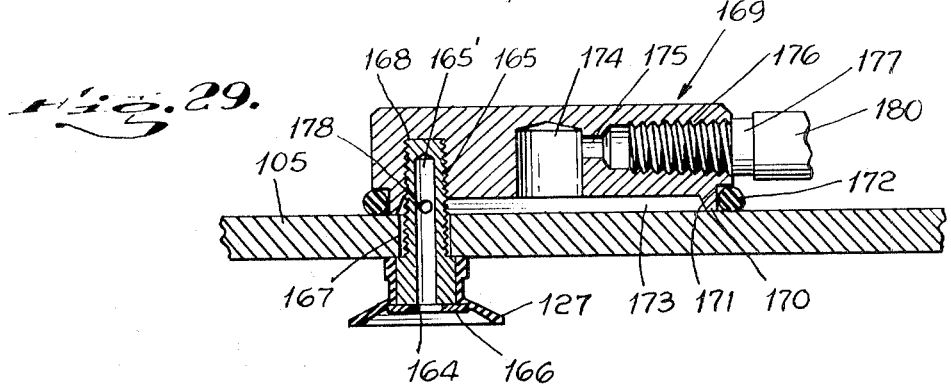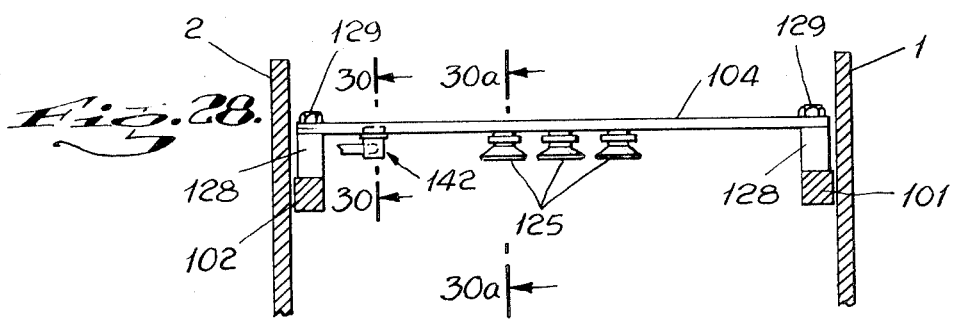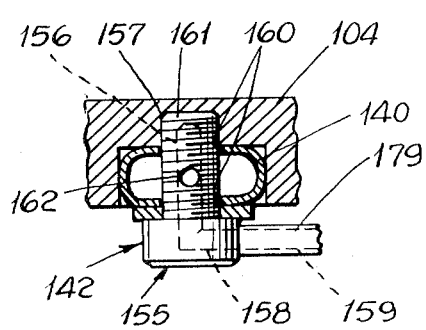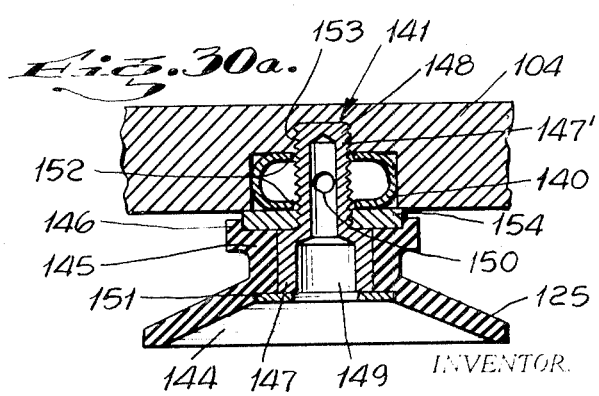

INVENTOR.
PAUL H. WECHSLER

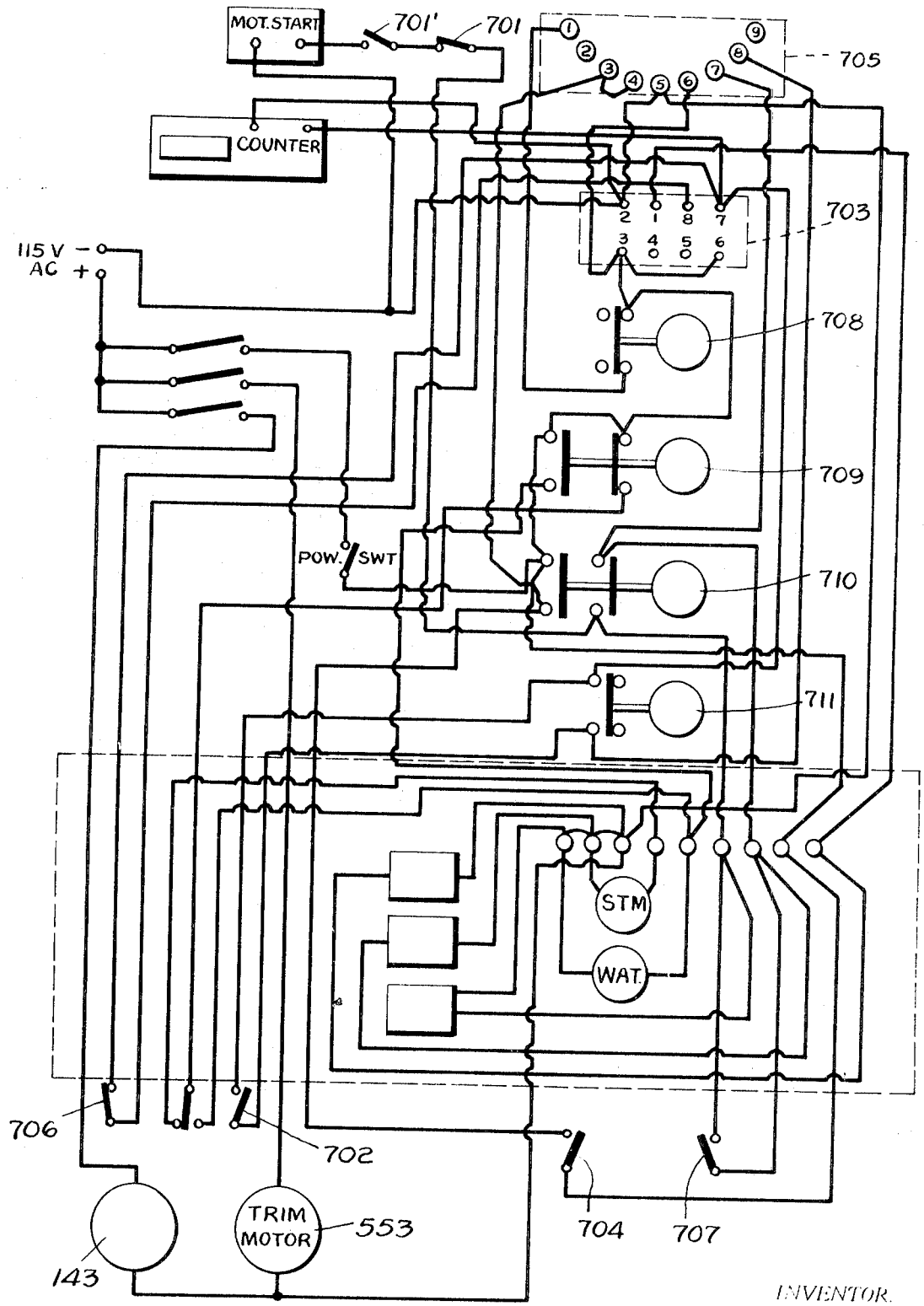

AUTOMATIC RECORD PRESS

BACKGROUND OF THE INVENTION

1. Field of the Invention

In its broadest aspect, the invention relates to multiple operation machines classifiable in Class 29–563. In the specific illustrated embodiment, the invention relates to phonograph record manufacturing machines generally classifiable in Class 18–16.

2. Prior Art

Having regard for the broad aspect of the invention, the known art includes U.S. Pat. Nos. 3,241,231; 3,266,140 and 3,293,743.

Having regard for the illustrated embodiment of the invention, the prior art known to applicant includes U.S. Pat. Nos. 2,743,478; 2,853,737; 3,086,512; 3,186,029 and 3,264,386.

SUMMARY

Efficient production of any article which requires a number of successive operations may be based on a time cycle involving the time required for that one of the series of operations which requires the longest time, plus the time for loading the article for the performance of that operation and plus the time for unloading it. This time may be reduced if the loading time can be combined with the unloading time. Specifically, in the present invention, there is provided a machine having a plurality of work stations for the successive operations required for the article. The workpieces are introduced at one of the stations and a reciprocating work transport means during its movement in one direction simultaneously advances all of the workpieces at the various stations at which work has been performed to the next station in the series. Thus, the unloading of one station is the loading of the next station.

In the illustrated embodiment, an automatic machine for producing phonograph records, the same instrumentality simultaneously advances all of the records at all of the stations on which operations have been performed to the next station in the series so that one handling time serves as the loading and unloading time interval for all of the stations and this is achieved with the consequent simplicity of not having a different transporting mechanism for each transport activity. Moreover, the transport means following the pressing of the record is such that a record which is still somewhat soft is safely handled without danger of surface damage or warping and the trimming of the flash is also accomplished while the record is in a relatively soft condition all of which contributes the efficient production of phonograph records at rates which are higher than has heretofore been thought possible.

Other objectives and advantages of the invention both for the manufacture of phonograph records and for the use of the principles of the invention for the manufacture of articles other than phonograph records will be apparent as the specific description of the illustrated and presently preferred embodiment of the invention proceeds.

BRIEF DESCRIPTION OF THE DRAWINGS

The accompanying drawings which form a part of the specification following illustrate a presently preferred embodiment of the invention and in these drawings:

FIG. 1 is a perspective view of an automatic machine for producing phonograph records embodying the invention;

FIG. 2 is a medial longitudinal side elevational view of the machine shown in FIG. 1, certain of the parts being shown in full lines where so doing better serves to illustrate the invention;

FIG. 3 is a top plan view taken in the horizontal plane of the top edges of the frame members of the frame structure, the portions of the machine extending above said plane being shown in section;

FIG. 4 is a top plan view taken in the same plane as FIG. 3 but showing the workpiece transport means at the end of travel opposite that shown in FIG. 3.

FIG. 5 is an enlarged scale, transverse, fragmentary sectional view taken generally in the plane of the line 5—5 of FIG. 2 of the raw-material-receiving station prior to the delivery of raw material thereto;

FIG. 6 is an enlarged scale, fragmentary sectional view of the apparatus shown in FIG. 5 taken at right angles thereto as indicated by the line 6—6 of FIG. 5 showing the delivery of a mass of softened plastic material from the supply source to the operating instrumentalities of the machine;

FIG. 7 is a view similar to FIG. 5 but showing the relative positions of the parts upon the completion of delivery of the desired quantity of material for a single record;

FIG. 8 is a greatly enlarged perspective view of one of the jaw elements employed in transporting the delivered material from the point of receipt of raw material to the next station of the machine;

FIG. 9 is an enlarged scale transverse sectional view taken generally in the plane of the line 9—9 of FIG. 2 showing the label-applying apparatus of the machine;

FIG. 13 is a transverse view on the axial line of the record pressing station, the plunger component being raised;

FIG. 13a is an elevation of a portion of FIG. 13 taken on the line 13a—13a of FIG. 13;

FIG. 15 is another view similar to FIG. 13 but showing the press closed and the record pressed with the flash engaging the gripper members;

FIG. 24 is an enlarged scale, vertical sectional view of the punch and die mechanism, the view being taken at right angles to and on line 24—24 of FIG. 20;

FIGS. 24a and 24b are sectional views taken on the lines 24a—24a and 24b—24b of FIG. 24, respectively;

FIG. 25 is a view transversely of the frame taken on the line 25—25 of FIG. 2 and showing the trimmer in its inactive position in full lines and the active position being indicated in dotted lines;

FIG. 25a is a sectional view taken on the line 25a—25a of FIG. 25;

FIG. 26 is a top plan view of the trimmer apparatus shown in FIG. 25 shown in its operative position in full lines and in its inactive position in dotted lines;

FIG. 27 is a top plan view of the rear end of the sled component of the machine particularly showing the crossmember which carry vacuum cups and the associated tubing extending between the vacuum source and vacuum cups;

FIG. 28 is a section taken on the line 28—28 of FIG. 27;

FIG. 29 is a transverse sectional view taken on the line 29—29 of FIG. 27;

FIG. 30 is a transverse sectional view taken on the line 30—30 of FIG. 28 showing particularly the interior construction of the manifold means for the rear crossmember of the work transporting sled;

FIG. 30a is a view taken transversely of the frame structure on lines 30a—30a of FIG. 28 showing the construction of a suction cup and manifold;

FIG. 31 is a view taken transversely of the frame structure on the line 31—31 of FIG. 2 and particularly showing the record cooling station;

FIG. 34 is a schematic drawing of the electrical system of the machine; and

FIG. 35 is a series of views showing the transformation of the initially received mass of plastic material into the finished record.

DETAILED DESCRIPTION OF PREFERRED EMBODIMENT

Figure 12:
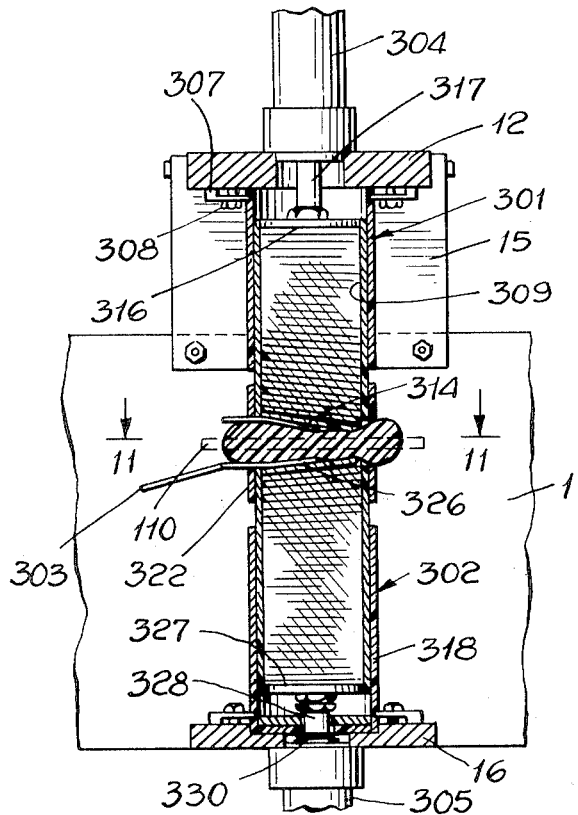
FIG. 12 is a fragmentary view generally like FIG. 10 but showing the magazines moved into label applying engagement with the record material and with the transport elements which will carry combined record material and label to the next work station disposed between the magazines to predetermine the thickness of the mass of the record material.
Figure 10:
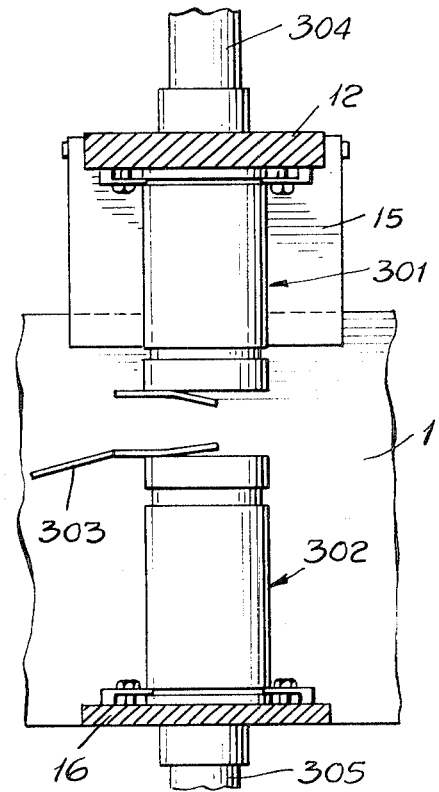
FIG. 10 is a view taken at right angles to the view of FIG. 9.
Figure 16:
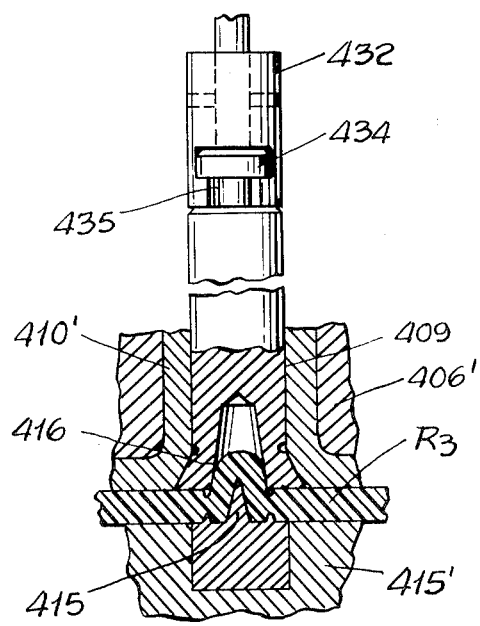
FIG. 16 is an enlarged scale, fragmentary, sectional view of the subassembly comprising the adapter, the plunger-operating cylinder and the plunger of the record press station, together with portions of the associated mold components in the position occupied when the press is closed.
Figure 11:
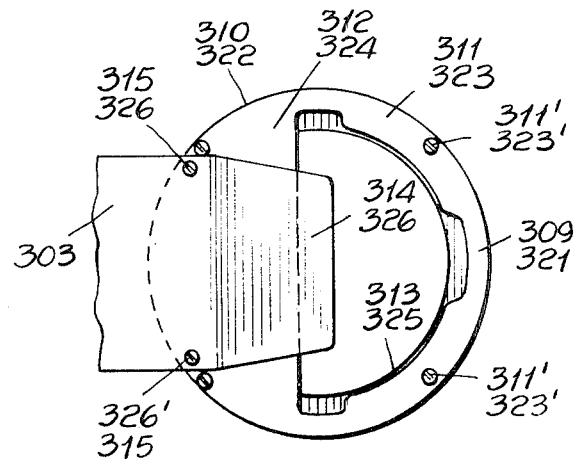
FIG. 11 is a duplex plan view of the label-dispensing ends of the oppositely disposed upper and lower label magazines which are mirror image duplicates wherefore, the identifying numbers of both magazines have been applied to each described component.

In general, the illustrated embodiment of the invention comprises an elongated horizontal frame structure along which various work stations are located including instrumentalities for performing the various successive operations in the production of a finished phonograph record from the raw materials. The frame structure also supports a reciprocable transport means (hereinafter called the "sled") which serves to transport the records in their various stages of completion from one work station to the next. In their order of succession, these work stations comprise, the raw-material-receiving station, the label-applying station, the record-pressing station, the hole-punching and flash trimming station, the record-cooling station and the finished-record-stacking station.

Believing that an understanding of the somewhat complex nature of the machine will be facilitated by an orderly system of numbers applied to the various elements and parts thereof, those numbers will be applied as follows:

Numbers 1 through 49 will relate to the frame structure including any crossmembers which may support operating parts.

Numbers 50 through 99 will relate to the plastic supply means.

Numbers 100 through 199 will relate to the sled and the portions thereof which engage and transport the records in its various stages of completion.

Numbers 200 through 299 will relate to the parts comprising the raw-material-receiving station.

Numbers 300 through 399 will relate to the parts comprising the label-applying station.

Numbers 400 through 499 will relate to the parts comprising the record-pressing station.

Numbers 500 through 599 will relate to the parts comprising the recording punching and flash trimming station.

Numbers 600 through 649 will relate to the parts comprising the record cooling station.

Numbers 650 through 699 will relate to the parts comprising the finished record stacking station.

Numbers 700 through 799 will relate to the electrical control system.

Numbers 800 through 899 will relate to the fluid systems including compressed air, steam and water.

Additionally, the record in its various stages of completion will be identified by the letter "R" with various increasing subscripts while the upper and lower labels will be identified as $L_1$ and $L_2$, respectively.

Referring to the drawings and more particularly to FIGS. 1 and 2, the frame structure of the machine comprises a pair of spaced parallel longitudinally horizontal heavy metal plates 1 and 2 disposed with the width thereof in parallel vertical planes, said plates being maintained in said spaced parallel relation by various interconnecting frame members and other structural elements which will be referred to in detail as the description of the disclosed embodiment proceeds. A series of legs 3 having their upper ends attached to the outer surfaces of the plates 1 and 2 adjacent the respective ends thereof supports the said frame structure in horizontal relation to the floor on which the machine is placed, the front and rear pairs of said legs being connected adjacent the lower ends thereof by stretchers 4. For convenience in the description of the machine, the end of the frame structure at which the raw material is introduced will be designated at the front end of the machine and the end of the frame structure from which the finished product is removed will be designated as the rear end of the machine.

Figure 3A:
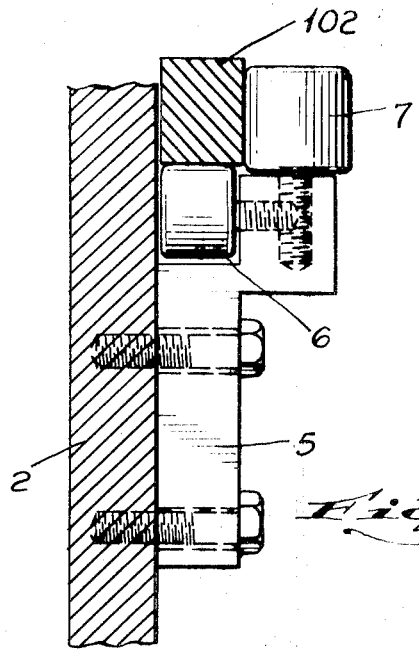
FIGS. 3a and 3b are enlarged scale, fragmentary sectional views taken on the lines 3a—3a and 3b—3b of FIG. 3, respectively.
Figure 3B:
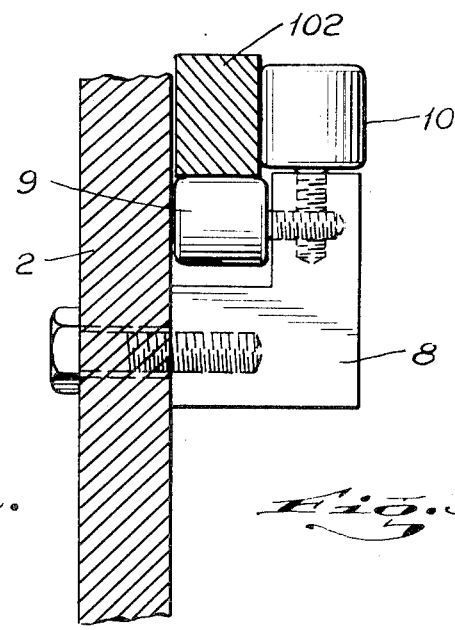
Figure 17:
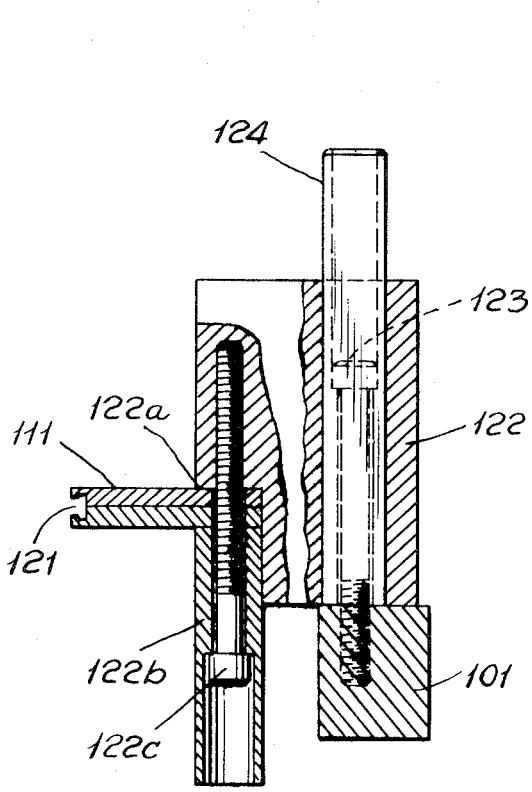
FIG. 17 is an enlarged and elevational view of one of the gripper block members and a mounting therefor which transports a pressed record from the record press.
Figure 18:
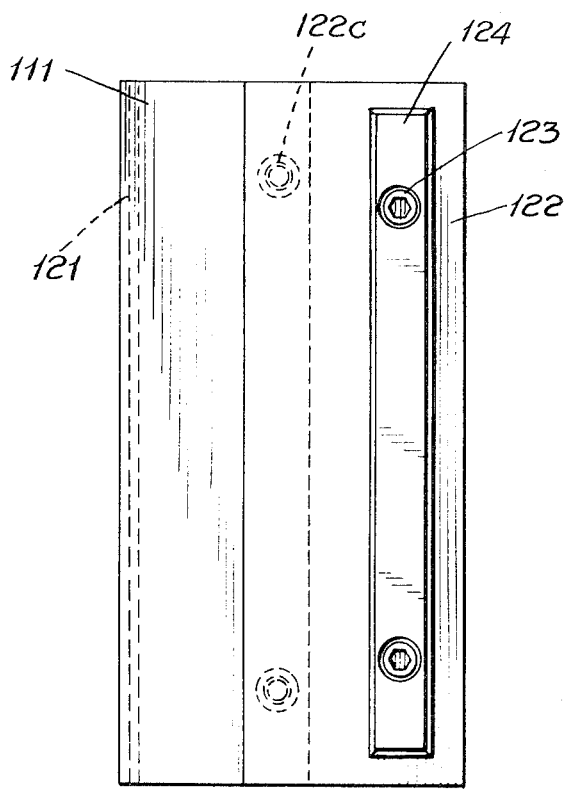
FIG. 18 is a top plan view of the gripper block and its mounting shown in FIG. 17.
Figure 14:
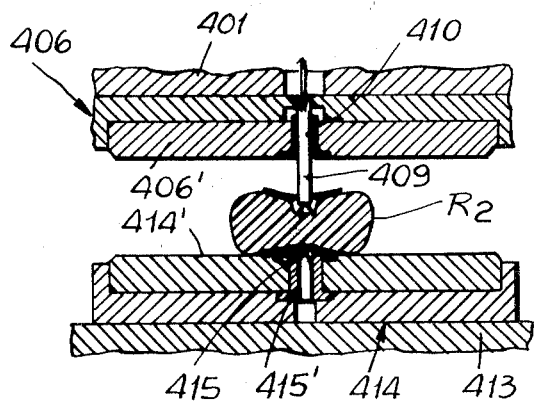
FIG. 14 is a fragmentary view of the center portion shown in FIG. 13 but with the record material moved into the mold and the plunger component moved down to grip the record material.
Figure 19:
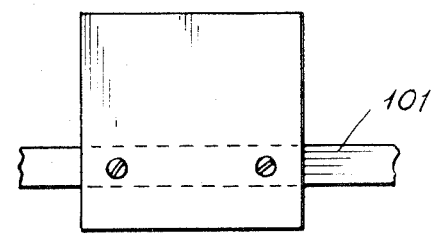
FIG. 19 is a side elevational view looking from the inside of one of the side members of the frame structure showing the safety block means which is employed to prevent unintended closure of the record press while being serviced.
Figure 21:
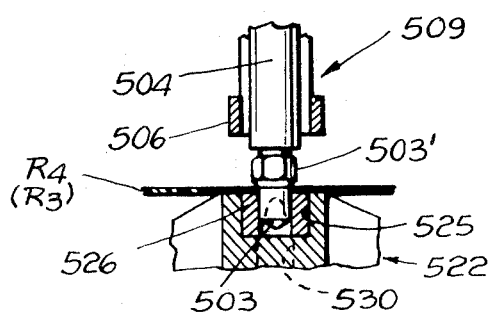
FIG. 21 is a fragmentary view of FIG. 20 but showing the punch at the end of its stroke forming the center hole of a record.
Figure 22:
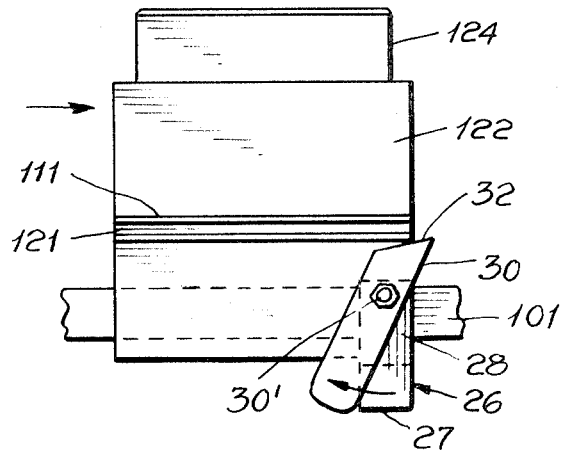
FIG. 22 is a side elevational view of the gripper means shown in FIGS. 17 and 18 moving past the associated stripper device.
Figure 23:
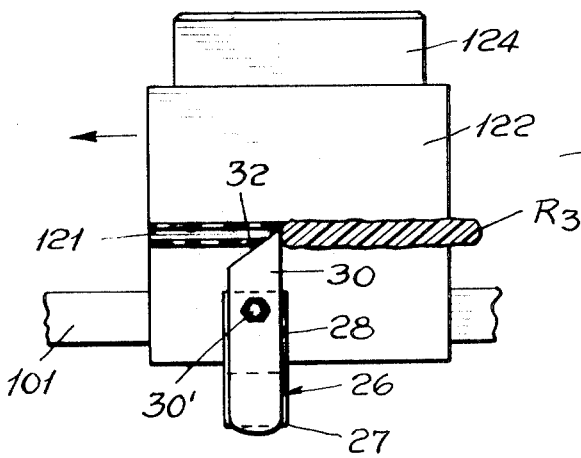
FIG. 23 is a side elevational view generally like FIG. 22 but showing the detent means engaging the flash of a record which has been transported to the punch and die station as the transport means begins to move in the opposite direction.
Figure 20:
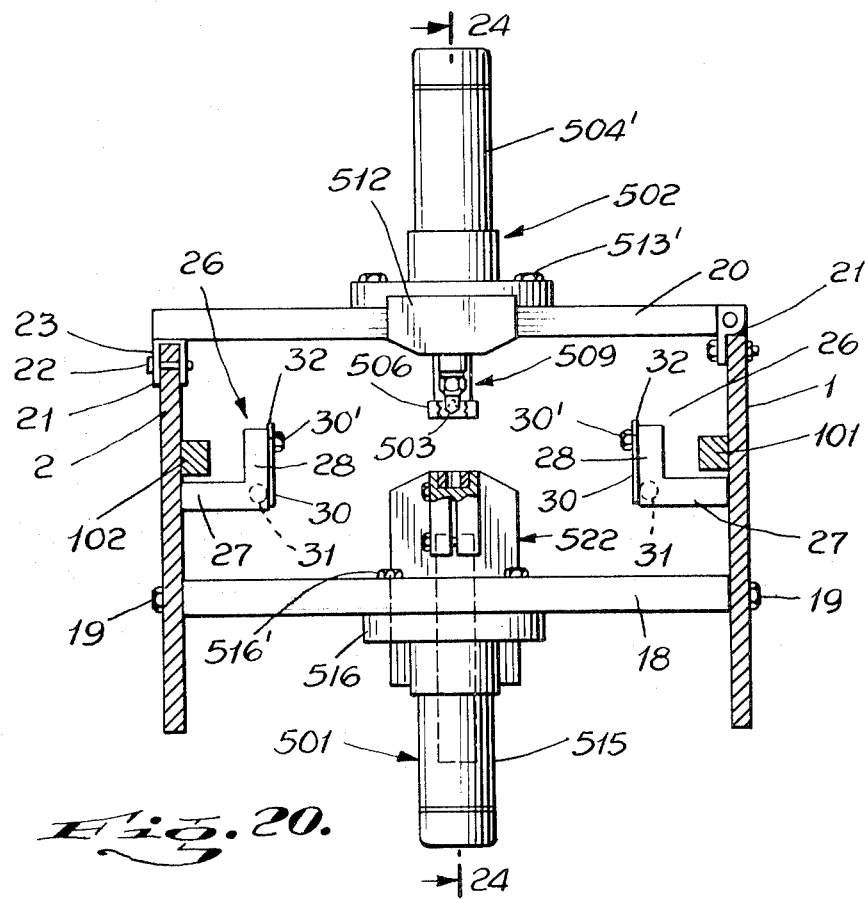
FIG. 20 is a transverse view of the punch and die station of the machine taken on the line 20—20 of FIG. 2.
Figure 32:
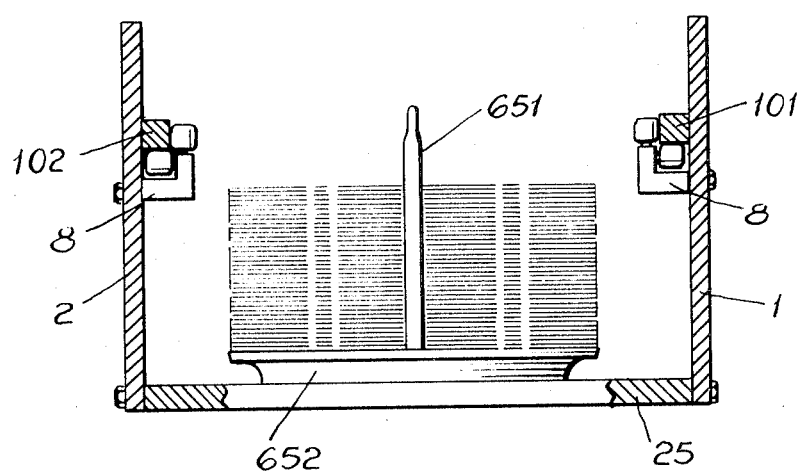
FIG. 32 is a view similar to FIG. 31 and similarly showing the station to which the finished articles are delivered.
Figure 33:
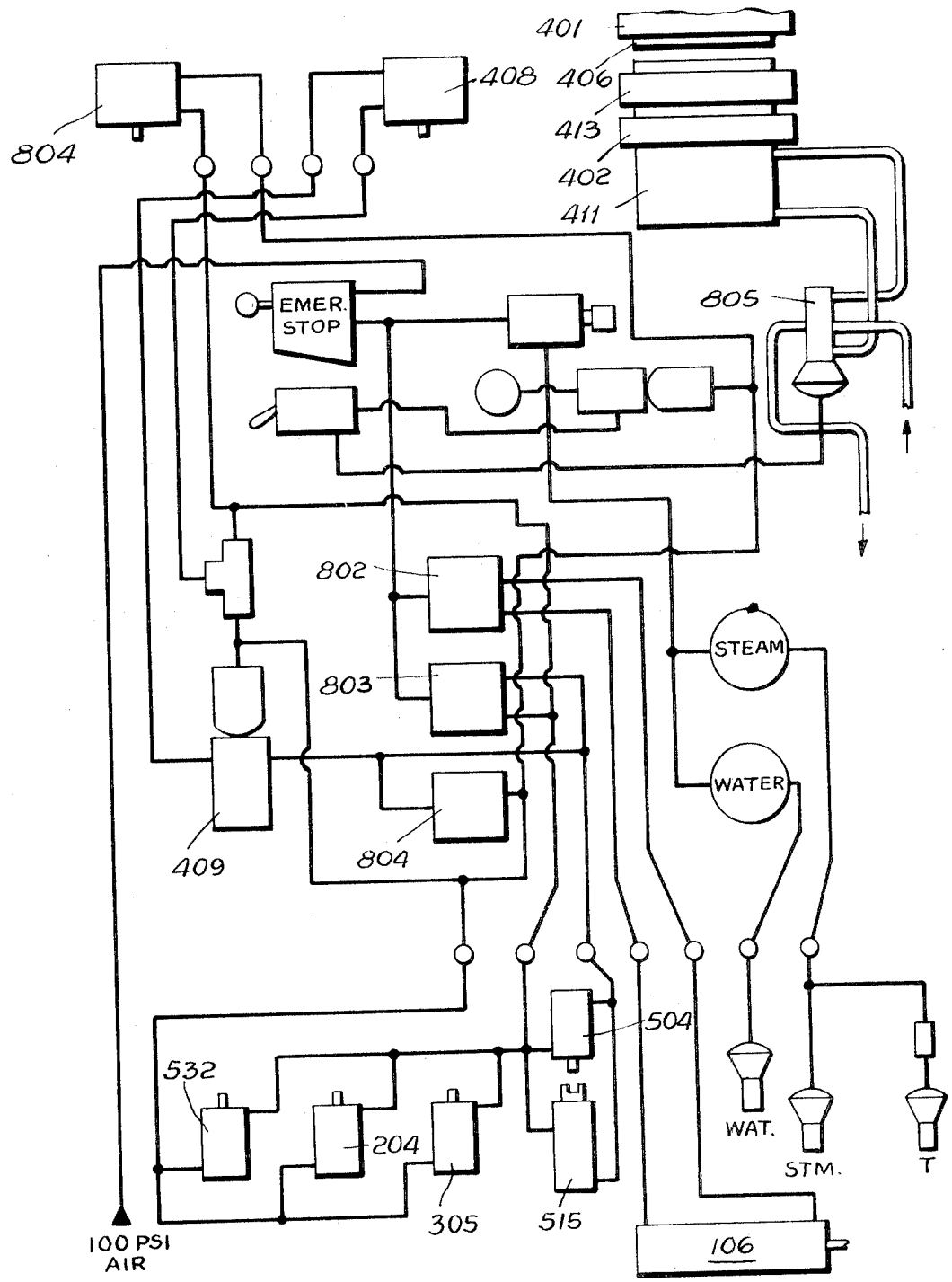
FIG. 33 is a diagrammatic view of the various fluid systems of the machine.

The frame structure supports a series of work stations best shown in FIGS. 2, 3 and 4, the stations being indicated from the front to the rear end of the machine and comprising the raw-material-receiving station 200, the label-applying station 300, the record pressing station 400, the record punching and trimming station 500, the record-cooling station 600 and the finished-record-stacking station 650.

The inner faces of the frame side members 1 and 2 adjacent the front ends thereof carry one each of a pair of mirror image bracket members 5, 5 each of which support a horizontal roller 6 disposed closely adjacent the frame member face and a vertical axis roller 7 spaced from said inner face and the inner faces of the frame members further carry one each of a pair of mirror image bracket members 8 rearwardly of the station 500 each of which similarly carries a horizontal axis roller 9 corresponding to the roller 6 and a vertical axis roller 10 corresponding to the roller 7. The sled 100 comprises a pair of elongated side members or rails 101 and 102 which are of rectangular cross section and which are interconnected in spaced parallel relation by a pair of front crossmembers 103 and 103' and by rear crossmembers 104 and 105. The rails ride on the horizontal rollers 6,6 and 9,9 and the sled is maintained in spaced parallel relation to the inner faces of the side members 1 and 2 by the engagement of the inner faces of the rails 101 and 102 with the vertical axis rollers 7,7 and 10,10. The stations are disposed equal distances apart longitudinally of the frame structure and the sled has an extent of travel equal to the distance between adjacent stations. In the illustrated embodiment, the means for reciprocating the sled in its said travel comprises a double acting pneumatic cylinder 106 attached to the inner face of the front end of the frame member 1, said cylinder having a piston rod slidable in a stuffing box means at the front end of the cylinder and having its distal end 107 attached to a plate 108 depending from the front end of the sled. The means by which the cylinder is connected to a pressure source and is caused to be actuated at specified times will be described in detail in connection with the description of the operation of the machine.

Before proceeding to a more detailed description of the mechanism, it may be pointed out that the front end of the sled rails carry one each of a pair of laterally opposing jaw elements 109,109 which, when the sled is in its forward position, are at the material-receiving position 200 to engage the mass of heated plastic material $R_1$ and to transport it to the label-applying position 300 on the rearward stroke of the sled. These sled rails further are provided with a pair of laterally opposing members 110,110 which are at station 300 when the sled is in its forward position and carry the plastic mass with the labels which are partially applied at station 300 and which is then known as the "sandwich" and designated as $R_2$ to the record-pressing station 400 on the next rearward movement of the sled. Likewise, the sled rails carry one each of a pair of record supporting members 111,111 which are mounted for horizontal movement with the sled and for bodily vertical movement relating to the sled which carry the pressed record $R_3$ from the pressing station 400 to the punching and trimming station 500 in the next rearward movement of the sled. The rear crossmember 104 of the sled is V-shaped as viewed in plan with the apex thereof extending rearwardly and carries vacuum cup devices to be later described in detail which engage the trimmed and punched record $R_4$ when the sled is at its forward position and at the rearward movement of the sled carry the engaged record to the cooling station 600. The rear ends of the sled rails are connected by the cross member 105 which also is provided with vacuum cup devices operative to pick up a record $R_5$ from station 600 and deposit it at the finished-record-stacking station 650. Thus, it will be seen that at each rearward movement of the sled five individual records in different stages of completion are moved simultaneously from the station occupied at the beginning of the rearward movement of the sled to the stations at which the next operation is to be performed.

The forward end edges of the frame members 1 and 2 support brackets 50,50 carrying a commercially available mechanism, generally indicated at 51 which includes a hopper carrying a supply of the granular plastic material and a power-driven kneading apparatus which through manipulation of the granular material generates sufficient heat in the material adjacent a discharge orifice 52 to render the material plastic. The discharge orifice 52 is located in the bottom surface of the mechanism 51 and is disposed above and in vertical axial alignment with a horizontal disc 201 having a depending central shank 202 which is mounted on and disposed in axial alignment with the upper or distal end of a piston rod 203 protruding from a double-acting pneumatic cylinder 204 which is secured to and depends from the underside of a crossmember 11 extending between the lower edges of the frame members 1 and 2. The upper surface of the disc 201 carries a low, centrally disposed boss 205 having a concave upper surface 206 which is axially aligned with the discharge orifice 52. Upon actuation in response to control means to be described, compressed air is supplied to the lower end of the cylinder 204 moving the piston (not shown) and the piston rod 203 with the disc 201 carried thereby upwardly. At the time this occurs, the sled is at its extreme forward position and the jaw elements 109,109 are disposed in opposing laterally spaced relation above the outer portion of the disc 201. The jaw elements 109,109 are carried on the free ends of one each of a pair of leaf spring assemblies 112,112 whose fixed ends are secured to the sled rails 101 and 102 by bolts 113, said leaf spring elements being supported against downward movement by underlying rigid bracket arms 114,114 which are also secured to the sled side rails by the bolts 113. Screws 115 secure one edge portion of each jaw element 109 to the associated spring leaf and the other edge of the jaw element projects beyond the distal end of the spring leaf and terminates in a shorter front gripping edge portion 116 parallel to the direction of travel of the sled and sloping downwardly toward the longitudinal centerline of the sled and a longer rear gripping edge 117 parallel to but offset slightly outwardly from the line of the edge 116. The screws 115 extend through the spring leaves and threadedly engage a pair of spacer blocks 118,118 at the under side of the spring leaves, said blocks overlying the edges of the disc 201 and upon upward movement of the disc by the cylinder 204 carry the distal ends of the springs upwardly until the top surfaces of the jaw elements 109,109 come into contact with the under surface of the plastic orifice member 52 and thus determine the thickness of the resulting plastic mass or "biscuit." This upward displacement of the jaw elements is shown in FIG. 7. Upon the accumulation of a sufficient quantity of the molten plastic material on the disc 201 as determined by displacement of a feeler 701 (see FIG. 6) of the electrical control system and through means to be later described in detail, the feeding of the material is stopped, the pressure supply to the cylinder 204 being thereafter reversed as will be later described, returning the disc 201 to the position shown in FIG. 5a, leaving the biscuit $R_1$ suspended between the jaw elements 109,109. On the rearward stroke of the sled, the biscuit supporting means comprising the jaw elements 109,109 and their supporting leaf springs 112,112 carry the biscuit $R_1$ to the label applying station 300 between the upper label magazine assembly 301 and the lower label magazine assembly 302 which at that time are retracted to permit the free entry of the biscuit therebetween, a ramp element 303, forming a part of a stripper element for the lower magazine assembly insuring guidance of the biscuit between the two magazines. When this biscuit is thus positioned, control means to be described simultaneously supplies pneumatic pressure back of the pistons of cylinders 304 and 305 which respectively cause the upper and lower magazines to move toward each other a sufficient distance to slightly compress the still plastic biscuit and in so doing cause portions of the exposed obverse surfaces of the outermost upper and lower labels $L_1$ and $L_2$ of the supplies thereof to be pressed against the surface of the biscuit and to be adhered thereto. The assembly 301 including the cylinder 304 is mounted on the under surface of a frame crossmember 12 having one end hingedly connected to the upper end of a bracket 13 carried by the frame member 1 and at its opposite end detachably secured by a latch pin 14 to a support 15 extending upwardly from the frame member 2. The assembly 302 is carried by a frame member 16 extending between the lower edges of the frame members 1 and 2 directly below the frame member 12 and secured by screws 17. The specific structure of the magazine assemblies and their operating cylinders will be presently described in detail.

While the biscuit and its thus partially applied labels (hereinafter designated as the "sandwich") is being gripped by the magazine assemblies 301 and 302, the sled operating cylinder 106 is energized by means to be described to return the sled to its forward position, thus, disengaging the jaw elements 109,109 and bringing the pair of jaw elements 110,110 carried by the distal ends of arms 119,119 which are secured to the sled rails 101 and 102 by bolts 120 opposite the sides of the biscuit which is then being gripped by the magazine assemblies. As best shown in FIG. 12, the compression of the sandwich by the label-applying magazine assemblies expands the plastic mass laterally into engagement with the jaw elements 110,110 for transport thereby to the next station, the record press 400 on the next rearward movement of the sled. After the expiration of a predetermined time interval as will be presently explained, the application of pressure to the cylinders 304 and 305 is reversed and the magazines are retracted with at least partial stripping off of the adhered labels from the magazines. Upon the expiration of the time for the longest of the operations performed by the machine, the pressing of a record at station 400, the sled is again caused to make a rearward movement carrying the sandwich $R_2$ into the record-pressing station 400 and then after the time interval allowed for the magazine assemblies to grip the next biscuit that has been moved into that station, the sled is returned to its forward position.

The record press means at station 400 comprises a head member 401 which rests on the upper edges of the frame members 1 and 2 and a base 402 engaging the lower edges of the frame members 1 and 2 directly below the head member, both of said members extending laterally beyond the outer faces of the frame members and being clamped to the frame members by tie rods 403 extending through bores 404 at each corner of the head and base members closely exteriorly of the frame members 1 and 2 and having nuts 405 at each end thereof, dowel pins 401' engaging the upper edge of the frame members 1 and 2 serving to locate the head member and corresponding dowel pins 402' engaging the lower edges of the frame members 1 and 2 and serving to locate the base 402. The underface of the head member 401 carries the interchangeable die assembly 406 which carries a die insert 406' to form the upper face of the record and the said member further is provided with a vertical bore 407 extending through the die assembly and bore in which a piston means 408 is operatively connected to actuate a plunger 409 which is slideable in an axial bore 410 in the center plate 410' of the upper die assembly into and out of engagement with the record.

The press base 402 carries cylinder means generally indicated at 411 and including a piston rod component 412 which at its upper end carries a platen 413 on the upper face of which the interchangeable lower die assembly 414 is mounted, said die assembly carrying the interchangeable die assembly 414' to form the underface of the completed record. For the moment, it is sufficient to say that as soon as the sandwich $R_3$ is moved between the die assemblies by the sled, the control system is actuated by means to be described to cause the plunger 409 to descend and anchor the sandwich against the lower die assembly, this action holding the sandwich against displacement as the sled is caused to move to its forward position carrying the jaw elements, 110,110 out of the path of the die assemblies and moving the members 111,111 to positions at each side of a vertical plane containing the peripheries of the two die assemblies. The return of the sled to its forward position actuates the control system to energize the press cylinder with resultant upward movement of the platen and lower die assembly and resultant pressing of the record, the surplus material being extruded between the die faces in the form of flash F. As a part of the pressing of the record, a centrally disposed conical pin 415 carried by the center plate member 415' of the lower die assembly cooperates with a larger, concentrically disposed conical recess 416 in the lower end of the plunger 409 to form a conical center portion on the pressed but untrimmed record $R_3$. The flash is sufficiently wide so that the portions which are extruded at the sides of the die assemblies adjacent the edges of the record-supporting members 111,111 of the sled are extruded into the longitudinally extending T-slots 121,121 formed in the edges thereof. Upon completion of the pressing time interval, the application of pressure to the press cylinder 411 is reversed causing the platen and lower die assembly together with the pin 415 to drop away from the record $R_3$ which remains supported by the said entry of the edges of the flash into the T-slots 121,121.

The members 111,111 are each carried by one each of a pair of heavy metal blocks 122,122 each having a vertical slot 123 extending therethrough freely slidably fitting over one each of a pair of guide members 124,124 carried by and extending upwardly from the sled rails 101 and 102. The edges of the members 111 remote from the T-slots 121 are clamped against overhanging ledges 122a on the blocks 122 by depending clamp members 122b and screws 122c extending through the clamp members and the members 111 and threadedly engaging the blocks 122. The lower edges of the clamp members are outside of the periphery of the lower die insert and depend from the sled a distance such that upon upward movement of the platen, these members are carried upwardly and position the T-slots in the line of extrusion of flash from between the die faces. Upon completion of the record pressing operation, the weight of the blocks 122,122, which are now attached to the record, is sufficient to strip the record from the face of the upper die assembly and carry it down with the lower die assembly to the extent permitted by the engagement of the blocks 122,122 with the top surfaces of the rails, the downward movement of the lower die assembly and the platen being sufficiently greater to allow the pin 415 to be drawn free from the cavity formed thereby constituting the interior surface of the conical protuberance at the center of the record thus leaving the record suspended and free to be moved to station 500 for the next operations.

The trimming and punching station 500, comprises a die assembly 501 secured to a cross-frame member 18 extending between the frame members 1 and 2 and secured by screws 19 and the cooperating punch assembly 502 carried by a cross-member 20 having one end hingedly secured to a bracket 21 mounted on the upper edge of the frame member 1 and having its other end detachably secured by a latch pin 22 to a bracket member 23 mounted on the upper edge of the frame member 2. The punch assembly 502 includes a hollow punch 503 removably secured by a spring jaw collet means including a nut 503' at the end of the piston rod 504 of a double action cylinder 504'. Upon presentation of a record from the press station, the die assembly 501 is moved up to the plane of the underside of the record as will later be explained and the punch is caused to descend and first center the record by engagement with the outer sloping surface of said conical center portion and then punch out that portion with resultant formation of the center hole of the record. The timing system of the machine, as will be later explained, maintains the punch in its down position where it serves as the pivot or axle on which the record $R_4$ freely turns as the flash is removed by trimming means generally indicated at 505 and which will later be described in detail. Upon completion of the trimming operation and the retraction of the trimming means, the cylinder 504' is actuated to withdraw the punch and in so doing the record clings to the exterior of the punch and until it encounters a stripper member 506 surrounding the punch and at that time the upper label area of the record is brought into contact with a series of vacuum cups 125 carried at the underside of the apex portion of the sled crossmember 104 which, when the sled is at its forward position, is so disposed that the notch 126 thereof is slightly rearwardly of the stripper member 506.

The stripper member is generally tubular and includes a flange 507 at the upper end thereof through which screws 508 extend to secure the stripper member to the underside of the frame crossmember 20 in concentric relation with the punch. An intermediate portion of the wall of the stripper member is cut away as at 509 to provide clearance for the bracket arm 510 which is clamped to the piston rod 504 by a clamp screw 511, said bracket arm carrying a vertically upwardly extending guide plate 512 disposed in close parallel proximity to the front face of the frame crossmember 20 serving to prevent rotative movement of the piston rod and punch.

The cylinder 504' is secured to the upper face of a mounting block or base 513 which is secured by screws 513 to the upper side of the frame crossmember 20 and said face and crossmember are provided with aligned bores extending therethrough as at 514 in the axial line of the punch and die assemblies 501 and 502 and through which bores the piston rod 504 extends. The upper end of the die assembly operating cylinder 515 is secured to the under face of a mounting block or base 516 which is secured to the under face of the frame crossmember 18 by screws 516' and said base and crossmember are provided with aligned bores indicated at 517 which extend therethrough in the axial line of the punch and die assembly and through which bores the piston rod 519 for maximum accuracy and is received in a cylindrical socket 521 in the die block 522, said die block having a split side 523 extending into said socket and a clamp screw 524 extending across said split serves to clamp the die block on the piston rod.

The upper end of the die block 522 is provided with a cylindrical recess 525 in which the annular die element 526 which cooperates with the punch 503 is removably seated and is secured by a clamp screw 527 extending across the split 523 in a horizontal plane containing the recess 525. A guide plate 528 has its upper end attached to the rear face of the die block by screws 529, said guide plate thence extending downwardly along the front face of the frame crossmember 18 and thus serving to prevent relative rotational movement of the die block above the axis of the piston rod 518. A passage 530 extends diagonally downwardly and rearwardly from the center of the recess 525 through the die block and the guide plate 528 to provide a passage through which the punched out conical protuberances may fall. Fixed to the front face of the guide plate 528 by screws 531 is a vertically disposed rectangular tube 532 having its upper end disposed in vertical alignment with and just below the emergence of the passage 530 through the guide plate 528 said tube serving to conduct received punchings vertically downward to a receptor means, not shown. The front wall of the rectangular tube is provided with openings 533 sufficiently large to receive the heads of the screws 531 incident to the assembly or removal of the tube from the guide plate 528.

In operation, at a time determined by the control mechanism of the machine as will presently be described, the cylinders 504' and 515 are simultaneously energized with resultant movement of the die block upwardly to a stopping point which positions the upper face of the die block closely adjacent to the underside of the center portion of the record which has previously been transported to that station and simultaneously, the punch is caused to move downwardly to first center the record by engagement of the conical protuberance of the record with the hollow center of the punch and then as a continuation of that downward movement of the punch to form the center hole in the record the "punch out" being discarded through the passage 530 and tube 532. It is to be noted that in this operation, there has been no contact whatever with either grooved surface of the record. The punch and die assemblies remain in this operative engagement to serve as a pivot or axial for the record while it is being trimmed by the trimming apparatus at this station which will now be described.

The trimming apparatus generally indicated by the numeral 505 is mounted on a frame structure crossmember 37 which extends between bracket members 38,38 depending from the lower edges of the frame members 1 and 2 and is secured to said brackets by screws 39. The crossmembers 37 is provided with a vertical bore 40 extending therethrough at a point midway between the midlength of the crossmember and the bracket 39 which depends from the frame member 2. A cam sleeve 534 extends through the bore 40, said sleeve having a flanged upper end 535 resting on the top surface of the crossmember and clamps 536 and screws 537 engage the flange and crossmember and clamp the flange against the upper surface of the crossmember in a desired rotative position. The lower end of the sleeve 534 engages the cupped end of a spacer sleeve 538, the lower end of which engages the head end of a pneumatic cylinder 539. Tie rods 540 having heads engaging the lower end of the upper head of the cylinder and threaded engaging the crossmember 37 serve to clamp the cylinder 539 and spacer sleeve 538 against the cam sleeve 534 and with all three of said components disposed in axial alignment. A cylindrical support member 541 is slideable in the cam sleeve and has the lower end thereof provided with a socket 542 in which the distal end of the piston rod 543 is seated and secured by a cross pin 544. The length of the member 540 is such that with the piston 545 at its lowest position in the cylinder, the upper end of this member extends above the upper end of the cam sleeve sufficiently to receive the split collar portion 546 of the trimmer-mechanism-supporting base 547 which is secured hereto by clamps 548. The cam sleeve 534 is provided with a cam slot 550 in a sidewall thereof and the support member 541 is provided with a cam follower roller 551 engaging said slot. The cam slot extends upwardly from its lower end vertically for a short distance and then in a helical direction such as to cause the support member and apparatus mounted thereon to move counterclockwise as viewed in plan as it continued its upward movement, the ends of said cam slot determining the limits of vertical movement of the support member and the apparatus carried thereby.

Secured by bolts 552 to the upper face of the supporting base 547 is a combined electric motor and a speed reduction unit 553 from which a drive shaft 554 projects, said drive shaft carrying a pulley 555. The upper side of the frame of the speed reduction component of the motor means carries a first support plate 556 secured thereto by countersunk head screws 557 and secured on the top surface of said support plate by screws 558 is a second support plate 559 on which the rotary trimmer unit 560 is mounted with an interposed spacer block 560'. The trimmer unit 560 includes a housing 561 in which a horizontal drive shaft 562 is journaled, one end of said shaft projecting beyond the housing and carrying a drive pulley 563 which is connected by a belt 564 to the motor pulley 555.

Journaled in the housing 561 parallel to and above the shaft 562 is a driven shaft 563 which, within the housing, is geared to the shaft 562 for synchronous rotation therewith but in the opposite direction. The shaft 562 projects beyond the end of the housing opposite the end carrying the pulley 563 and a sleeve member 564 is mounted on this end of a shaft and secured by a dowel pin 565 with the outer end of the sleeve substantially flush with the end of the shaft. The outer end of the sleeve terminates in a reduced diameter portion forming a hub 566 upon which a lower cutting blade 567 is clamped by a washer 568 and a screw 569 threaded into the end of the shaft 562. The blade 567 is a ring of frustoconical cross section disposed with the larger diameter thereof facing the rib 566 and said larger diameter is slightly greater than the center distance between the shafts 562 and 563.

The shaft 563 projects beyond the housing 561 above the shaft 562 and loosely mounted on the exposed end of this shaft is a sleeve 570 provided with elongated, diametrically opposite slots 571. A cross pin 572 extends through and is fixed to the shaft and the ends of the pin engage the slots 571 thus confining the sleeve 570 to movement axially of the shaft. The outer end of the sleeve terminates in a rib and hub portion 573 generally similar to the blade-carrying hub 566 of the sleeve 564 and a second cutting blade 574 is mounted on this hub portion, said blade being identical to the blade 567 except for being mounted in the opposite direction so that the two large diameters face each other. An axial thrust bearing 575 is mounted on the shaft 563 adjacent to housing 560 and a compression coil spring 576 surrounds the sleeve 570 and reacts between the thrust bearing 575 and the rib 573' formed integrally with the sleeve 570 and which combines with the reduced-diameter end portion to form the hub portion 573 on which the blade 574 is mounted, it being noted that the distance between the shafts is such that the blades slightly overlap.

Assuming that the sled has presented a pressed record to the punching and trimming station, the completion of that action produces a signal to the control system of the machine which causes the cylinders 504' and 515' to be energized to (a) move the die up to the under face of the record and (b) to cause the punch to descend and form center hole in the record. The completion of the punching operation then signals the control system to energize certain other cylinders including the trimming mechanism cylinder 539, which then is at its position of repose, causing it to elevate the trimming mechanism carried thereby and simultaneously start the trimming-mechanism-driving motor 553 with resultant rotation of the trimming blades. As the cylinder 539 raises the trimming mechanism, the trimming mechanism is initially in a position in which the blade-carrying shafts are substantially at right angles to the length of the fram structure and out of contact with the record. The continued upward movement of the trimming mechanism causes the cam follower to engage the helical portion of the cam 550 causing the trimming mechanism additionally to turn approximately 45° about the axial line of the support member 541. The trimming mechanism is so positioned on the support that upon the completion of this upward and rotative movement (which is counterclockwise as viewed in plan), the center lines of the shafts 562 and 563 are disposed substantially radially of the centerline of the record and at the radial dimension of the trimmed record.

In this final portion of the swinging movement they have encountered the flash of the record and since they are rotating in directions complementary to the turning movement of the trimming mechanism, they will have cut across the flash and when they reach the extremity of this movement, the point of intersection of the two blades is in the horizontal plane of the record which, incidentally, is still not hardened, and the continued operation of the blades will draw the record into and through (cutting off the flash in a strip which falls into a chute 577). As will be later explained, at the time the blades encounter the flash, the sled will have returned to its front position freeing the record from the gripping members 111,111 by which it was transported to the punching and trimming station. On completion of the cycle, the pressure to the cylinder 539 will be reversed retracting the cutting means to its said position of repose and discontinuing the supply of operating current to the trimming mechanism motor. It will be understood that for different sizes of records, the trimming apparatus will be suitably positioned on the supporting means so that in the cutting position it will occupy the correct radial distance.

Of the record-handling components of the machine, there remains to be described the structure by which the records are transported from station 500 to station 600 and again from station 600 to the final station 650. The fact that the sled crossmember 104 and 105 are provided with vacuum cups for this purpose has been briefly mentioned.

As the punch is retracted the vacuum cups 125 are in communication with the vacuum source and thus engage and hold the punched and trimmed record $R_4$, lifting the record into engagement with the stripper member 506, which is in the same horizontal plane as the edges of the vacuum cups and continue to hold it thus suspended as the sled makes its rearward excursion. This positions the record centered over the cooling station 600 and upon breaking of the vacuum, the record will drop over the centering pin 604 of the supporting disc 601 of that station. The disc is mounted on the upper end of the mandrel 602 which is slideably mounted in a vertical bushing 23 carried by a frame crossmember 24 secured to the frame members 1 and 2 by screws 24'. A collar 603 surrounding the mandrel and resting on the crossmember 24 determines the normal position of the disc 601 relative to the path of a record delivered thereto.

When the sled thereafter returns to its forward position, the crossmember 105 will be positioned over the cooling station 600 and the underside of the member 105 is provided with a second set of vacuum cups 127 so positioned on the under face thereof that at the forward position of the sled, these cups are over the upper label surface of the cooling record $R_5$. While the sled is thus at its forward position, the trimming apparatus 505 is caused to execute its operation and incident to its movement into position to effect the trimming operation, a cam 507 carried by a portion of the trimming means engages the mandrel 602 and lifts the disc 601 and the record thereon into such close proximity to the vacuum cups 127 that upon energization of those vacuum cups, the record is held thereby. The continued movement of the cam enables the disc and mandrel to fall away from the record leaving the finished record held by the cups 127. Then, upon rearward movement of the sled, the finished record $R_6$ will be positioned above and in close proximity to the upper end of the centering pin 651 which extends upwardly from a base 652, said base being carried by a crossmember 25 extending between the frame members 1 and 2, and upon release of the vacuum, the completed record is dropped over the pin 651 and onto the stack of completed records at the stacking station 650.

Having carried a record through the machine to completion in a description in which the transporting movements of the sled has received primary consideration, certain other components of the machine which are present to insure proper and safe operation of the machine will be described. The means by which the material of the record is caused to effect interengagement with appropriate instrumentalities of the sled has already been noted. At the record-pressing station at which the surplus material which forms the flash and which is forced into the T-slots 121,121 may not readily detach itself from those slots when the record is advanced to the punching and trimming station. The record is still soft from the pressing operation and therefore can not be held by the punch since the imposed stress would at least warp the record. The disengaging means must be such as will apply no stress to the record per se. In the present embodiment of the invention this record-disengaging means comprises a pair of mirror image L-shaped brackets 26,26 having the foot ends thereof attached at transversely opposite points on the inner faces of the frame members 1 and 2 so that the upper faces of the foot portions 27 and the inner faces of the stem portions 28 thereof define channels through which the side rails 101 and 102 of the sled pass and are disposed longitudinally of the frame structure so that when the sled is at its rearmost position, the front ends of the members 111,111 will have just passed beyond the rear edges 29,29 of a pair of pivotally mounted detents, 30,30 carried by screws 30', 30'' on the faces of the stems 28,28 which are remote from the frame member on which the respective brackets are mounted. These detent supporting faces are disposed in vertical planes which are just beyond the distal ends of the members 111,111 and the upper ends of the detents are normally at a position which intersects the path of the flash as a record is being transported to station 500. These detents have sufficient mass disposed below the pivot points thereof so that they normally hang with the rear edges thereof in a vertical attitude and the respective brackets on which they are pivoted include stop elements 31,31 operative to prevent rotational movement of the detents incident to movement of the sled toward the front of the machine through engagement of the flash adjacent the edges of the members 111,111 in which the grooves 121,121 are located. The upper ends of the front faces of the detents are inclined upwardly and rearwardly as at 32,32 so that the rearwardly moving record and surrounding flash will cause the detents to swing on their pivots to permit passage thereof but as soon as the record has passed them, they resume their vertical position immediately adjacent the trailing edges of the members 111,111. Then as the sled retracts, these detents engage the flash and since reverse swinging movement is prevented by the stops 31,31 they hold the record in place at station 500 without imposing any warping stress on the record. Additionally, any tendency of the flash to rupture and leave a portion thereof in the T-slots is eliminated.

To assist in the release of the flash from the T-slots they are preferably formed slightly increasing in cross-sectional dimension from front to rear. This is most readily achieved by forming each member 111 of mirror image upper and lower halves having grooves formed therein which, when the halves are combined, form the T-slots with the desired taper.

The slowing up of the sled as it approaches the ends of its travel is not a function of the sled-operating cylinder. For this purpose a separate snubbing means is employed comprising a hydraulic cylinder with flow rate restriction means between the ends thereof. Specifically, the crossmember 104 of the sled is mounted thereon with interposed spacer blocks 128,128 interposed between the ends of said member and the sled rails 101 and 102 with screws 129,129 extending through the member ends and spacer blocks and threadably engaging the rails. Similarly, the ends of the crossmember 105 are secured to the sled rails with interposed spacer blocks 130,130 and screws 131,131.

Fixed to the frame member 1 just above and parallel to the rail 101 and between the blocks 128 and 130 which are secured to that rail is a horizontal hydraulic cylinder 33 having a piston 34 reciprocable therein and carrying a piston rod means including a front facing end 35 and a rear facing end 36 positioned to be engaged, respectively, by the spacer blocks 128 and 130 as the sled reciprocates. The cylinder is filled with fluid and has limited flow rate means between its opposite ends so that as the sled approaches either end of its travel, one or the other of the spacer blocks will engage the extended end of the piston rod means and move it and the piston with it until the sled reaches the end of its travel. This snubbing means is made possible by positioning the spacer blocks 128 and 130 which engage the snubbing cylinder means apart a distance which is equal to the length of travel of the sled plus the overall length of the snubbing device and in the present embodiment this has been achieved by positioning the spacer blocks 128,128 that distance from the spacer blocks 130 resulting in the V-shape of the crossmember 104 to retain the center portion thereof in proper cooperative relation with the station 500.

The operating cycles of the machine terminate with the completion of each rearward movement of the sled and thus at such times no record is engaged at any of the stations. This permits adjustment or other servicing to be performed with the incident removal of any records which may be in process at the time of stoppage since such stoppage would have allowed them to cool and congeal beyond any possibility of further operations being performed. Access to the work stations 300 and 500 is had by swinging up the crossmembers which support the instrumentalities working on the top of the record, but servicing the record press may involve reaching between the then separated die inserts. As a safety measure, means is provided to prevent any closing of the press while the machine is stopped. This means comprises a pair of blocks 132,132 carried by the sled rails at such a point therealong that when the sled is at its rearmost position, these blocks are disposed between the opposing faces of the press head member 401 and the platen 413 adjacent the side surfaces of the die inserts and the height of said blocks being only slightly less than the clearance between said faces when the press is in its open position. Thus, if some defect in the control system should cause the press to try to close while the blocks were thus positioned, the blocks would prevent the closing thereof and possible injury to an operator servicing the die inserts. Conversely, if the press should be accidentally caused to close while the sled was in its forward position, the rear end faces of the blocks would then engage the front face of the elevated platen and thus prevent the rearward movement of the sled, giving immediate notice of trouble.

To further decelerate the sled as it moves rearwardly, the end plate 108 carries a rearwardly extending rod 133 on which a compression spring 134 is loosely mounted for reaction between the rear face of the end plate 108 and the front face of a guiding collar for the rod 133 which projects laterally from a bracket 37' carried by the frame member 1. As the sled is moved rearwardly, the compression of this spring provides increasing resistance so that the sled comes to a smooth stop at the rear end of its stroke without imparting any deceleration forces to the records being transported and particularly to the still soft record being transported from the pressing station to the punching and trimming station.

Referring now to the label-applying station 300, the upper label magazine assembly comprises an alignment tube 306 having its upper end fitted in complementary grooves formed in the under face of the frame crossmember 12 and secured thereto by clamps 307 and screws 308. Loosely mounted within the alignment tube is the tubular upper label magazine 309 having an internal diameter only slightly greater than the diameter of the labels contained therein. The magazine tube extends downwardly below the alignment tube and terminates in a collar member 310 which at its outer end carried a closure member 311 secured thereto by screws 311'. The closure member comprises a sheet metal disk having an opening of D-configuration cut therein leaving a segmental pressure portion 312 disposed at the side toward the front of the machine and ledge portions 313 spaced from each other and slightly overhanging the interior of the magazine toward the rear of the machine. Additionally, the end member carries a leaf spring member 314 having one end secured thereto by screws 315 at the side of the lower end toward the front of the machine, and having the free end thereof extending downwardly and rearwardly. Within the magazine, a pressure plate 316 is secured to the distal end of the piston rod 317 of the cylinder 304 which extends through an opening in the frame crossmember.

The lower label applying means includes an alignment tube 318 disposed in alignment with the upper assembly and having its lower end fitted in complementary grooves in the frame crossmember 16 and being secured to said crossmember by clamps 319 and screws 320. Slidably mounted in the alignment tube 318 is the lower label magazine tube 321 terminating at its upper end in a cylindrical collar 322 to which an end closure member 323 is secured by screws 323', said end closure member being a mirror image duplicate of the member 311 including the pressure portion 324 and ledge portions 325. An upwardly and rearwardly extending spring leaf member 326 overlies the end member in mirror image relation to the leaf spring 314 and is secured to the collar member by screws 326'. Within the magazine tube 321 a metal disc 327 carried by the piston rod 328 of the cylinder 305 forms a bottom for the magazine. The frame crossmember 16 is provided with an opening 329 affording clearance for the piston rod and for a compression spring 330 surrounding the piston rod and reacting between the end of the cylinder 305 and the underside of a disc 33 loosely fitting within the alignment tube at the lower end thereof and engaging the lower end of the magazine tube to provide a lifting bias thereto and thus leaving the cylinder free to exert the desired pressure on the plastic material through the supply of labels as will be presently described.

In operation, when the cylinders 304 and 305 are retracted, the rearwardly converging ends of the spring leaves 314 and 326 are spaced apart a distance which is less than a thickness of the biscuit received from station 200 and hence are sprung apart by the entrance of the biscuit. When the sled returns to its front position, the ends of the spring leaves dig into the surfaces of the biscuit and hold it in position between the label applying magazines. The movement of the sled brings the members 110,110 into position at opposite sides of the biscuit. As best seen in FIG. 3 the members 110,110 are secured to the underside of the arms 119,119 by screws 135 which threadingly engage spacer blocks 136 underlying the members 119 and the length of the arms 119 are such that the distal ends thereof as well as the edges of the blocks 136 overlap the end members 310 and 323 slightly so that when the pressure is applied to the cylinders 304 and 305 to move the magazines toward each other, the thickness of the resulting article will be the combined thickness of one of the arms 119, one of the members 110 and one of the spacer blocks 136. As a part of this compression, the portions of the obverse sides of the upper and lower labels, which are exposed by the D-shaped openings therein, have been caused to be adhered to the surface of the biscuit (now called the sandwich). At a given time interval, the pressure on the cylinders 304 and 305 is reversed separating the magazines from the sandwich with the labels slightly pulled from the magazines and with the edges of the labels which were under the ledges 313 and 325 pulled out therefrom as shown in FIG. 12. At the same time, this further compression of the biscuit material has caused it to be displaced laterally into engagement with the exposed edges of the members 110,110 and therefore, the next rearward movement of the sled will carry the sandwich rearwardly to station 400 pulling the unattached portions of the levels which were back of the portions 312 and 324 of the end members out of the magazines without disturbing the labels still in magazines.

Further considering the record pressing station 400, the operating cylinder 408 for the plunger 409 is open at its rear or upper end and said open end is secured in a bore 417 in the shank portion 417' of a holder 418 which is slidably mounted in the upper end of the bore 407. The holder is provided with a larger diameter head portion 418' and with a flat face 419 extending along the shank portion and a portion of the head which is slidably engaged by the end of a latch pin guide 420 secured to the top surface of the press head 401. The latch pin guide 420 carries a latch pin 421 slidably mounted therein and yieldingly urged toward the holder 418 by a spring 422, said latch pin having a knob 423 at its outer end for manipulation and the inner end of the latch pin being engageable with a recess 424 in the said flat face. When thus engaged, the holder is elevated as indicated in FIG. 13 and when released, the holder and cylinder may be lowered until the shoulder 425 at the end of the face 419 engages the upper side of the latch pin guide or, upon disengagement of the plunger as will presently be described, the holder and cylinder can be removed from the bore 407.

The upper end of the holder is provided with a first inlet port 426 which is connected by an axial bore 427 with the bore 417 and hence with the upper end of the cylinder 408. The holder is provided with a second inlet port 426' from which a passage 428 extends parallel and adjacent to the bores 417 and 427 to the inner end of the holder shank. The lower end of the cylinder 408 has an inlet port 429 in the sidewall thereof and a tube 429' connects this port with the passage 428. Air entering the port 429 will move the piston of the cylinder 408 upwardly carrying the piston rod 431 and the plunger 409 with it to the extent limited by the engagement of the conical surface 409' of the plunger 409 with the complementary counterbored outer end of the bore 410 in the center plate member 410'. Below the port 429, the cylinder 408 carries a washer 430 closely fitting the bore 407 and holding the lower end of the cylinder and its piston rod in axial alignment with the bore 407.

The lower end of the piston rod 431 carries a connector 432 having a notch 433 in the side thereof in which the head portion 434 and neck portion 435 of the plunger 409 are removably received by lateral movement relative thereto as shown in FIG. 13a. Since a change in die inserts involves the removal of the plunger 409, the latch pin 421 is pulled out to allow the holder 418 and the cylinder assembly to be lowered to the extent permitted by the shoulder 425. Then, with the piston of the cylinder 408 at its lowest position, the connector 432 will be positioned below the die insert and the plunger can be disconnected. If desired, the holder can be lifted at least to its latch position, the exchange of die inserts effected and then, with the connector again lowered, the plunger can be reconnected and the holder restored to its operative position. Of course, if other servicing is required, the holder and cylinder assembly can be completely removed, the inlet ports being provided with nipples connected by hoses to a source of compressed air to permit such manipulation.

The V-shaped frame crossmember 104 is formed from metal plate and the underside thereof is provided with a shallow groove including a run 137 extending along the limb 138 of said member which extends diagonally rearwardly and toward the apex end of the crossmember and said groove thence continuing in a curved portion 139 which is generally concentric with the curvature of the apical notch 126 terminating a short distance beyond said notch. Mounted in this groove is a flattened metal tube 140 of complementary configuration said tube being sealed at each end thereof and being secured in the groove by the mounting means 141 for the vacuum cups 125 and by the connector means 142 for a flexible hose by which the tube is connected to a motor driven vacuum pump 143 which is mounted on the frame crossmember 37 adjacent to the trimming apparatus.

Each of the vacuum cups 125 is mounted by an identical means, wherefore, a description of one (See FIG. 30a) will serve for all. Each vacuum cup is formed from soft elastomeric material and comprises a hollow cup portion 144 shallow frustoconical configuration and a short, hollow cylindrical shank portion 145 extending in axial alignment from the smaller end of the cup and terminating in a laterally flanged distal end 146. The securing means for the vacuum cup also serves as the conduit connection between the tube and the cup and comprises a socket head screw 147 modified by having a small axial bore 148 extending from the socket 149 in the screw head through the stem 147' and by a cross bore 150 disposed to intersect the bore 148 at a portion thereof which intersects the interior of the flattened tube. The head of the screw is widened laterally by welding or otherwise mounting a washer 151 thereon to overlie a portion of the interior of the cup 144. The flattened sides of the tube are provided with pairs of axially aligned bores 152 through which the stems 147 of each of the associated screws extend and the crossmember 104 at the bottom of the groove is provided with a series of shallow threaded bores 153 which are in axial alignment with the bores 152, said threaded bores being adapted to be engaged by the threaded ends of the screws 147. Additionally, a washer 154 is interposed between the vacuum cup end and the underface of the crossmember 104 to prevent the tightening of the screw 147 from crushing the tube and to form a sealed base for the flanged end of the vacuum cup. Thus, it will be noted that upon the application of vacuum to the flattened tube through the connector means 142, that evacuation will cause air to try to enter to the vacuum cups and through the centers of the screws by which the vacuum cups are thus connected to the crossmember 104 and to the tube carried thereby.

The connector member 142 is similarly formed from a screw 155 having an axial bore 156 extending through the stem end 157 into the screw head and communicating within the head with a radial bore 158 which is extended from said head by a hose nipple 159. The stem 157 extends through aligned bores 160 in the flattened sides of the tube at the end thereof which is remote from the vacuum cup and the distal end of the stem engages the threaded bore 161 in the bottom of the groove. The underside of the screw head engages an interposed gasket washer to afford an airtight seal. The portion of the stem 157 between the walls of the tube is provided with a cross bore 162 which affords communication between the bore 156 and the interior of the tube. Thus, vacuum applied through the hose nipple 159 will evacuate the air in the tube through the axial bore 156 and the communicating cross bore 152. It is particularly to be noted that this connector means also serves as the mounting means or securing means for that end of the flattened tube.

Of the record handling components of the machine, there remains to be described the structure by which the records are transported from station 500 to station 600 and again from station 600 to the final station 650. The fact that the sled crossmembers 104 and 105 are provided with vacuum cups for this purpose has been briefly mentioned.

The vacuum cups 127 carried by the frame crossmember 105, like the cups 125, are disposed in an area in which they will contact only the label area of a record and preferably are arranged at equal distances from the axial line of the record and at equal distances from each other. The cups, per se, are identical with the cups 125 and each cup is secured to the underside of the crossmember by a hollow screw 164 generally similar to the screw 147 but with a longer threaded stem portion 165 having an axial bore 165'. At its outer end, the screw has a washer 166 attached thereto to engage the interior of the cup portion of the vacuum cup. The screw stem extends through a bore 167 in the member 105 and threadedly engages a bore 168 in a disclike manifold member 169 mounted on the top surface of the crossmember 105. Closely externally of the threaded bores 168, the bottom surface of this manifold member is provided with an annular rib 170 which is disposed inwardly of the outer periphery of the manifold member and the outer surface of said rib and the shoulder of the juncture thereof with the outer periphery of the member together with the top surface of the crossmember 105 combined to form a groove 171 in which a sealing O-ring 172 is received, said rib forming a disclike cavity 173 bounded by the interior surface of the rib 170 and the adjacent surfaces of the manifold member and the crossmember. At its center, the manifold member is provided with a bore 174 extending upwardly from the cavity 173, said bore communicating with a radial bore 175 which, at the periphery of the head member, terminates in a threaded portion 176 in which a nipple 177 is connected. Each of the screws 164 is provided with a cross bore 178 affording communication between the space 173 and the axial bore 165'. Thus, as in the case of vacuum cups 122, the mounting means serves additionally as the means for providing a securing means for the manifold serving the vacuum cups and as the conduit means between the manifold and the individual vacuum cups. A first hose 179 connects the connector nipple 159 with the intake of the vacuum source 143 and a second hose 180 connects the nipple 177 of the manifold member 169 with the vacuum source. The vacuum pump 143 is connected by a flexible tubing 181 to a valve 182 mounted on the frame member 2 adjacent to the path of travel of the sled side member and a pair of flexible tubes 183 and 184 extend from a common connection to this valve to the connector 142 on the crossmember 104 and the nipple 185 extending from the side of the manifold member 169 on the crossmember 105. When the sled is moving to the rear end of its travel, the vacuum cups 125 and 127 are supporting records and at the end of the travel, the valve is operated by a detent on the sled to admit air into the vacuum line thus breaking the vacuum and allowing the records to drop at the respective stations.

While a presently preferred control means for the automatic performance of the machine is shown, it is recognized that once the requirements of an automatic machine are known, the details of providing the specific elements of a control system are not beyond the skill of the machine control art. In the illustrated embodiment, the control system includes an electrical system controlling the timed actuation of a pneumatic pressure system and a hydraulic pressure system. Thus, once the primary objective of the machine embodying the plurality of spaced work stations served simultaneously and progressively by a single workpiece transport means has been achieved, the art of devising the necessary controls is primarily a matter of selecting the devices and components which are available on the open market which can be combined to achieve the desired result. Accordingly, the description of the control system will be less specific than the description of the other details of the machine.

The general details of the control system of the illustrated embodiment of the invention can best be understood from a description of a cycle of the automatic operation of the illustrated embodiment of the machine. The starting point of the cycle will be assumed to be the instant at which the pressing of a record at station 400 has been completed. At this instant, as will be later described, the control system operates to cause the press ram and all operation performing instrumentalities to move simultaneously to their respective inactive positions. As a part of this retraction, as the press ram reaches the lower end of its stroke, it closes a switch 702 which, through a relay means 703, operates a solenoid controlled four-way valve 802 interposed between the opposite ends of the sled operating cylinder 106 and a source of pneumatic pressure to cause the cylinder to move the sled through the rearward portion of its travel transporting the records in their various stages of completion from the station at which the preceding operation was performed to their position in the next station. At the completion of this movement, the vacuum cups may have dropped the records carried thereby, but the records at the other stations are still held by the transporting instrumentalities on the sled. As the sled reaches the rear end of its travel, it closes a switch 704 which starts a self-resetting timer 705 and the timer causes actuation of a second solenoid controlled four-wave valve 803 which is interposed between the pneumatic pressure source and the opposite ends of the cylinders 504' and 515 which operate the punch and die components and the cylinder 408 which operates the plunger 409 associated with the pressing station 400, the said actuation causing the punch and die to form the center hole in the record and the plunger 409 being caused to engage and clamp the "-sandwich" against the lower die surface including impaling it on the center pin 415.

The completion of the punching action opens a switch 706 which unlocks the relay 703 and this reverses the valve 802 causing the cylinder 106 to return the sled to its forward position disengaging its record holding instrumentalities from the records in process which were advanced in the preceding rearward movement. The completion of this return movement of the sled closes a switch 707 which causes a third solenoid controlled four-way valve to activate the operation performing instrumentalities at the various work stations. This includes causing the cylinder 204 to raise the receptor plate 201 to accept the next increment of plastic material, causing the cylinders 304 and 305 to move the two label magazines into contact with the biscuit deposited between them, causing the cylinder 539 to lift the record trimming means 505 into operative position and the actuation of a pilot valve 804 to cause a four-wave hydraulic valve 805 to connect the underside of the press ram cylinder with a source of hydraulic pressure. Simultaneously with this, the timer will have started the trimmer motor 553 and the motor of the vacuum pump 143 as well as initiating the delivery of a batch of the plasticized record forming material to the receptor plate 201, it being noted that the quantity is controlled by the means operating the switch 701 and that this operation is completed well before the expiration of the time interval measured by the timer.

At the expiration of the predetermined time interval for which the timer is set, it resets itself to zero and reverses the valves 803 and 804 thus withdrawing all operation performing instrumentalities to their inactive positions. Also, it opens the various switches which it closed thus stopping the trimmer and vacuum pump motors and the means controlling the delivery of plasticized material to the receptor plate by opening the switch 701'. At this instant, as the completed biscuit is holding the switch 701 open, but as soon as the sled makes its next rearward excursion, this switch will close. Thus, the cycle of operation will be noted to have been completed with respect to the point at which it was assumed to have started, viz, the instant at which the operation performing instrumentalities begin their retraction to inactive position.

Control systems of the general character above described are generally provided with manual means for effecting various phases of the machine cycle for service and maintenance purposes and the present system includes such means in the form of a series of spring biased pushbutton switches 708, 709, 710 and 711 which normally occupy the positions indicated in FIG. 34. Depressing the button for switch 708 has the equivalent effect on the system as does the termination of the time interval determined by the timer. The manual operation of switch 709 may be used to control the supply of steam and cooling water to the mold, a matter with which, as hereinafter explained, the present invention is not concerned. Depressing the button of switch 710 achieves manually the same result as the closing of switch 704 by effecting the return of the sled to its front position, viz, the actuation of all of the operation performing devices at their work stations. Depressing the button of switch 711 has the same effect as the closing of switch 702 by the retraction of the ram to the end of its downward travel.

Since the illustrated embodiment of the broad aspects of the invention is a phonograph record press and since for that usage the use of heated molds or dies is required, the drawings indicate provision for steam for heating and water for cooling the mold surfaces. By reason of the facts that the principles of the invention are employable for other automatic manufacture and that any invention specifically relating to the molds, per se, may be employed in other record pressing mechanisms, no detailed description nor claims for any invention which may reside in the molds, per se, is here set forth.

While the foregoing disclosed embodiment relates to the production of phonograph records, the invention, in fact, contemplates other usages. For example, the label applying station 300 might equally well be employed to effect initial attachment of a component or components of metal or other material other than a label to the article being manufactured, which could be something other than a phonograph record, and the pressing station 400 could be employed to impart a shape to that article other than a flat disc as is suggested by the formation of the center conical protuberance which is later discarded in the formation of the center hole of the record. The fundamental concept is the elongated frame supporting a plurality of equidistantly spaced stations combined with a transport means having workpiece-engaging means capable of transporting a plurality of workpieces in their individual stages of completion simultaneously to the next station on which a succeeding operation is to be performed. In the light of this concept, those skilled in the art will be able to devise the special equipment for the transport means and for each work station for articles other than phonograph records, wherefore, additional drawings and disclosures of one or more other embodiments has been omitted.

I claim:

1. An apparatus for manufacturing complete phonograph records from a supply of moldable plastic material and a supply of labels comprising:
   a frame structure supporting a plurality of different processing stations to which a record is delivered by a transport means in step-by-step progression for the performance of the various successive processes involved in the manufacture of the record;
   a pressing station and a hole-forming station, said pressing station pressing a record and simultaneously forming a concentrically disposed protuberance; and
   said hole-forming station including a means of centering said record with respect to the hole-forming apparatus by location on said protuberance prior to the formation of the hole.

2. The apparatus of claim 1 wherein:
   said hole-forming apparatus is comprised of a punch and a die, said punch having a concentric cavity therein which is adapted to engage said protuberance on said record and encourage said record into concentric alignment with said punch by the initial travel of said punch prior to punching said hole by the continued travel of said punch with respect to said die.

3. An apparatus for manufacturing complete phonograph records from a supply of moldable plastic material and a supply of labels, said apparatus including a frame structure supporting a plurality of different equidistantly spaced processing stations to which a record is delivered in step-by-step progression for the performance of the various successive processes involved in the manufacture of the record and a transport means movable on said frame structure along a path of travel defined by said stations, said processing stations including a material-receiving station, a label-applying station, and a press station, said transport means including record-engaging means operable simultaneously to carry all of the records from all of said stations at which processing has been performed in their respective stages of manufacture to the next ones of said stations in said step-by-step progression, said transport means being reciprocable on said frame structure in a path at least equal to the distance between adjacent ones of said stations and having holding means which are positioned, when said transport means is at the end of its said path of travel from which it moves to transport records progressively through said apparatus, to supportingly engage records at said material-receiving station, said label-applying station, said press station, and operative to transport all of said records so engaged simultaneously to the next station in a progression of operations, said holding means engaging said records at said material-receiving station and said label-applying station being means for undirectionally engaging said record for transport to said next station, whereby said record is positively encouraged to travel to said next station upon the forward motion of said transport means, but may readily slip out of said holding means upon the rearward movement of said transport means, said holding means engaging said records at said material-receiving station, said label-applying station and said press station by the plastic deformation of said records resulting from the processing performed at each of said stations.

4. An apparatus for manufacturing complete phonograph records from a supply of moldable plastic material and a supply of labels, said apparatus including a frame structure supporting a plurality of different processing stations to which said plastic material is delivered in step-by-step progression for the performance of the various successive processes involved in the manufacture of a record, and a transport means movable on said frame structure along a path of travel defined by said stations, said processing stations including a label-applying station, said label-applying station having a pair of cylindrical label-supplying magazines disposed at opposite sides of the path of travel of said plastic material transported to said label-applying station by said transport means, each of said magazines having a closure member at the plastic-material-engaging end thereof, and each of said closure members having a D-configuration opening therein exposing a corresponding area of one of said labels for engagement with said plastic material, said D-configuration opening being disposed in the direction of the path of travel of said plastic material said apparatus, and said label-applying station further having pressure-applying devices operative to effect simultaneous engagement of the obverse sides of the exposed ones of the supplies of labels in said magazines to opposite sides of said plastic material with resultant simultaneous adhesion of one each of the labels to one each of the opposite sides of said plastic material.

5. An apparatus for manufacturing complete phonograph records from a supply of moldable plastic material and a supply of labels, said apparatus including a frame structure supporting a plurality of different processing stations to which said plastic material is delivered in step-by-step progression for the performance of the various successive processes involved in the manufacture of a record, and a transport means movable on said frame structure along a path of travel defined by said stations, said processing stations including a label-applying station, said label-applying station having a pair of cylindrical label-supplying magazines disposed at opposite sides of the path of travel of said plastic material transported to said label-applying station by said transport means, each of said magazines having a closure member at the plastic-material-engaging end thereof, and each of said closure members having a D-configuration opening therein exposing a corresponding area of one of said labels for engagement with said plastic material, said D-configuration opening being disposed in the direction of the path of travel of said plastic material said apparatus, and said label-applying station further having pressure applying devices operative to effect simultaneous engagement of the obverse sides of the exposed ones of the supplies of labels in said magazines to opposite sides of said plastic material with resultant simultaneous adhesion of one each of the labels to one each of the opposite sides of said plastic material, said plastic-material-engaging end of each of said magazines further having a compliant member attached thereto extending from adjacent said plastic-material-engaging end of each of said magazines to a position rearward of said magazines and defining a converging channel in said path of travel of said plastic material, and said converging channel defining a free separation distance of said compliant members which is less than the thickness of said plastic material being delivered to said label-applying station so that said compliant members engage said plastic material as it is being delivered to said label-applying station and prevent the subsequent rearward movement of said plastic material upon the rearward movement of said transport means.

* * * * *